United States Patent

[11] 3,593,630

| [72] | Inventor | Lawrence M. Douglas<br>Easton, Mass. |
|---|---|---|
| [21] | Appl. No. | 837,510 |
| [22] | Filed | June 30, 1969 |
| [45] | Patented | July 20, 1971 |
| [73] | Assignee | Polaroid Corporation<br>Cambridge, Mass.<br>Continuation-in-part of application Ser. No. 784,064, Dec. 16, 1968. |

[54] BRAKING AND SEQUENCING MECHANISM
25 Claims, 14 Drawing Figs.

[52] U.S. Cl............................................. 95/10, 95/53, 95/64
[51] Int. Cl........................................ G03b 7/08, G03b 9/06, G03b 9/60
[50] Field of Search............................ 95/10 C, 53, 53 E, 64, 64 C

[56] References Cited
UNITED STATES PATENTS
| 3,348,460 | 10/1967 | Schmitt.................. | 95/10 (C) |
| 3,411,421 | 11/1968 | Bestenreiner............... | 95/10 (C) |
| 3,416,421 | 12/1968 | Biedermann et al.......... | 95/10 (C) |
| 3,464,332 | 9/1969 | Davison et al............... | 95/10 (C) |
| 3,482,497 | 12/1969 | Ernisse...................... | 95/10 (C) |

*Primary Examiner*—Samuel S. Matthews
*Assistant Examiner*—Joseph F. Peters, Jr.
*Attorneys*—Brown and Mikulka, William D. Roberson and Gerald L. Smith ABSTRACT: A mechanism for an exposure control system operative to sequentially control effective aperture and exposure interval. The mechanism features an actuator component which is operative to perform exposure mode sequencing in addition to actuating an aperture diaphragm brake. The actuator component is configured to operate codirectionally with the actuating portion of the brake assembly. This codirectional operation permits a high and repeatable responsiveness necessary to proper operation of the exposure control system. The actuator component also is operative to actuate any necessary switching of the control system when it is altered from an aperture regulating mode to an exposure interval regulating mode.

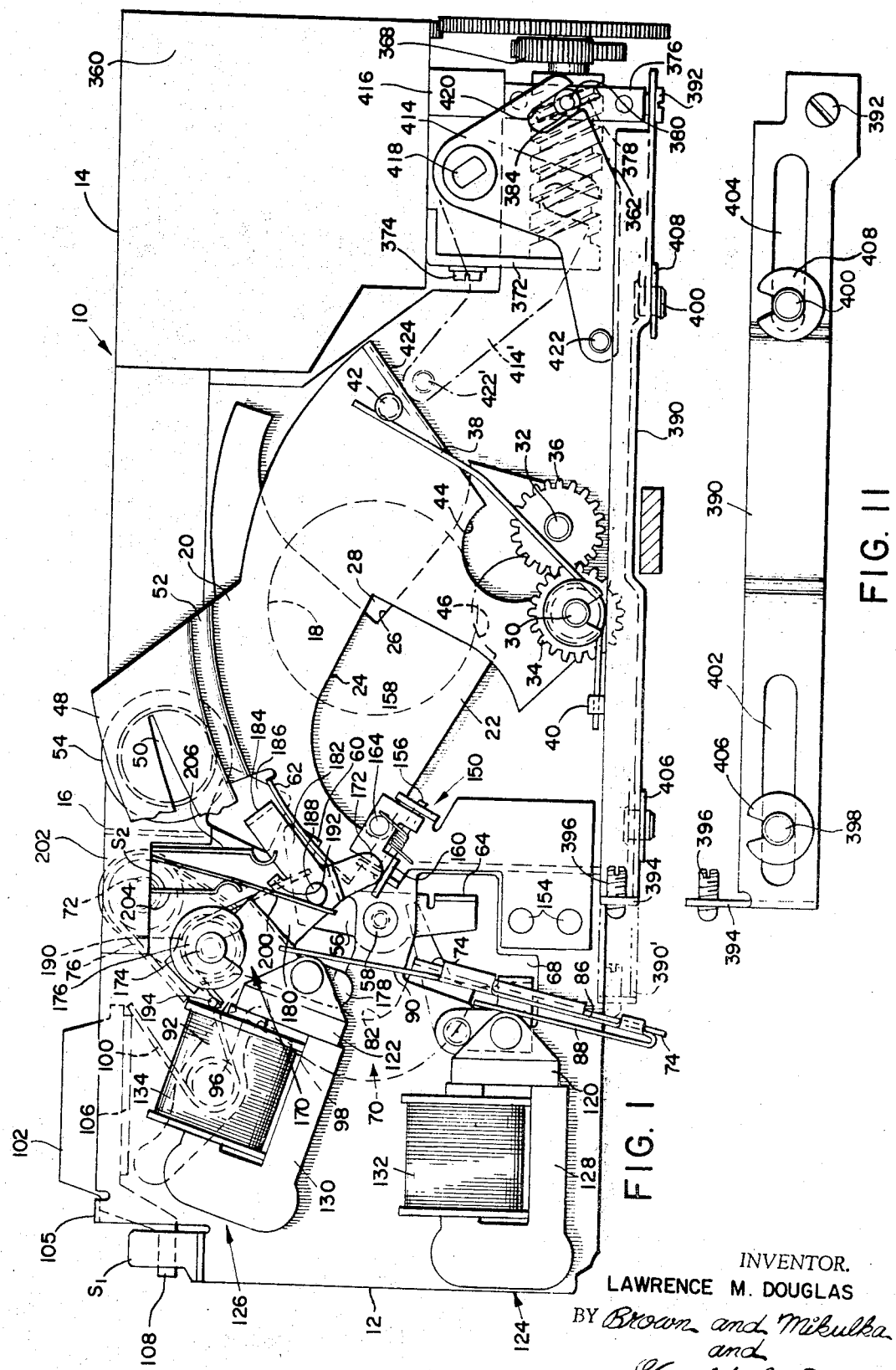

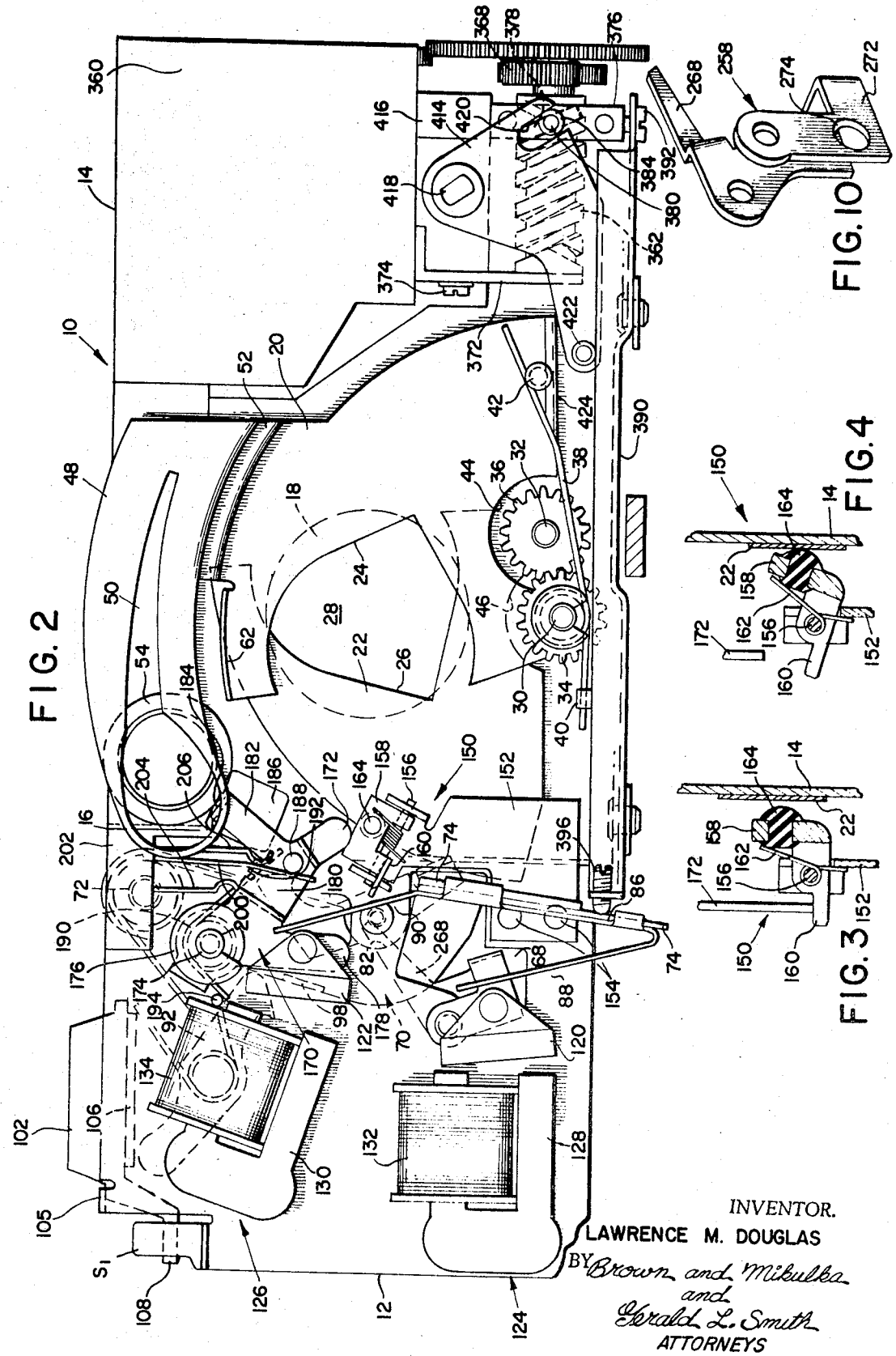

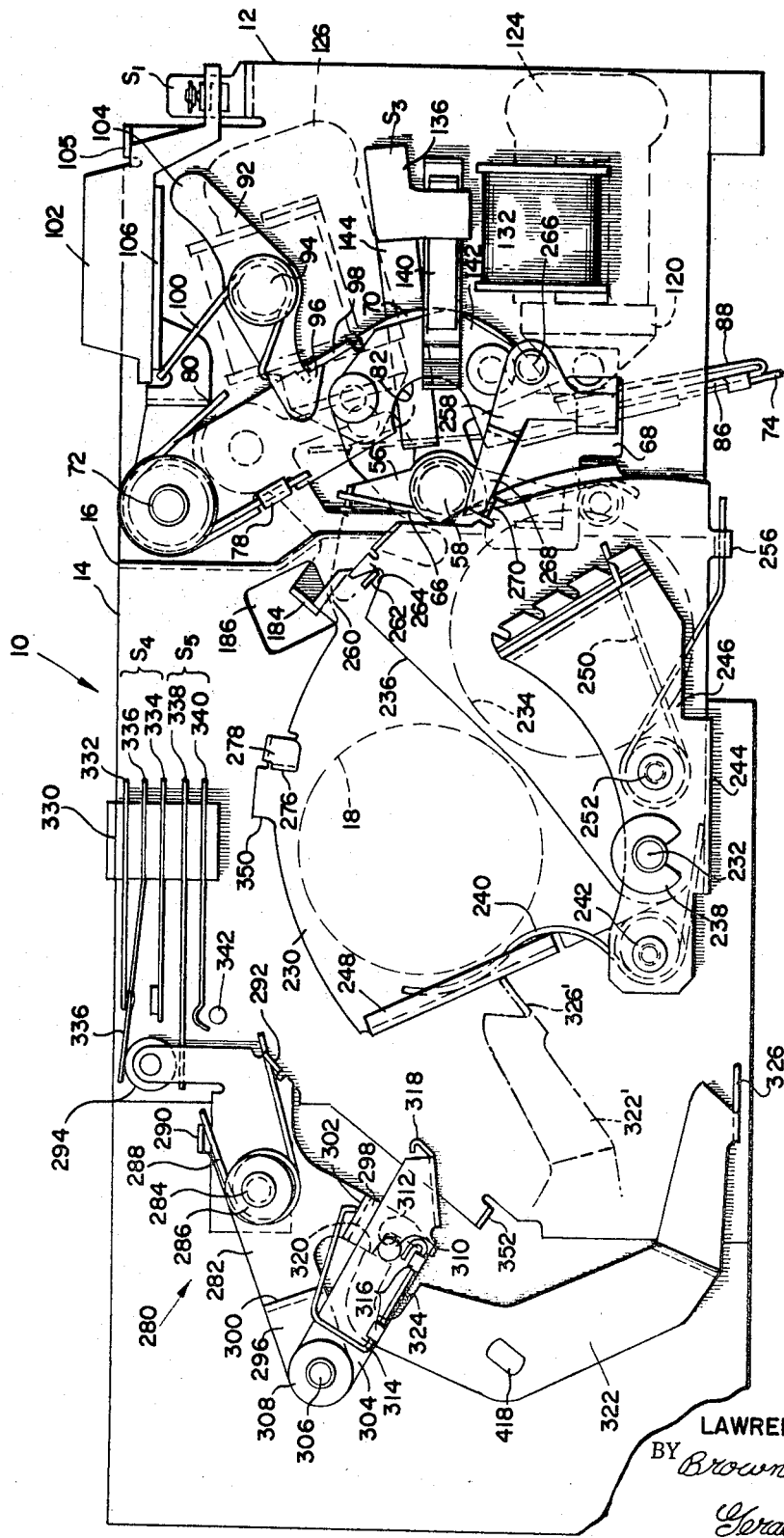
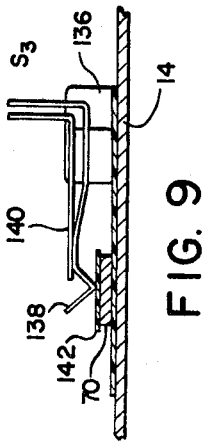
FIG. 6
FIG. 9
INVENTOR.
LAWRENCE M. DOUGLAS
BY Brown and Mikulka
and
Gerald L. Smith
ATTORNEYS

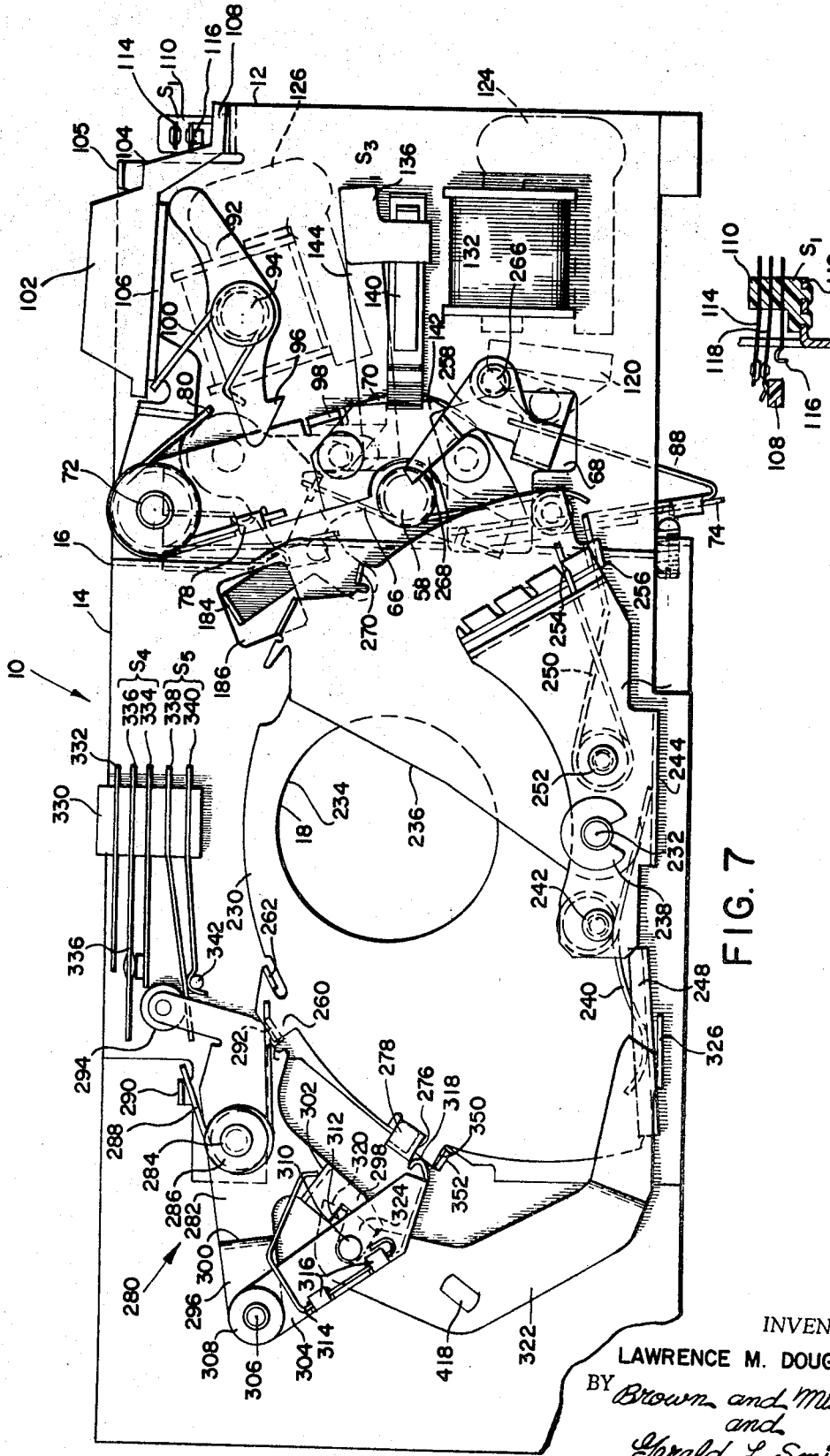

INVENTOR.
LAWRENCE M. DOUGLAS
BY Brown and Mikulka
and
Gerald L. Smith
ATTORNEYS

BRAKING AND SEQUENCING MECHANISM

CROSS REFERENCE TO RELATED APPLICATIONS

The present application is a continuation-in-part of copending U.S. application for Pat., Ser. No. 784,064, filed Dec. 16, 1968 and entitled, "Aperture Defining Exposure Control System."

The present invention relates to exposure control systems for photographic apparatus and, more particularly, to a control mechanism for automatically regulating both the effective area of an exposure aperture and the exposure interval during which light passes through such aperture.

BACKGROUND OF THE INVENTION

Exposure control systems which automatically regulate both aperture selection and exposure interval incorporate interface assemblies coupling an exposure mechanism and its control circuit. For such control systems, a mere passive response by a mechanism to a control electrical event is not sufficient. The exposure mechanism is called upon to insert a feedback into the control circuit to signal such events as the end of one operational mode regulation and the commencement of another as well as the status of its initial regulating orientation. Additionally, the regulating mechanism is called upon to perform a variety of switching functions for the control circuit depending upon the complexity of an exposure logic program under which it operates.

In one dual exposure parameter control system, sequential regulation of the parameters is provided and the mechanism first establishes proper aperture and then uncovers and covers this aperture for a select exposure interval. The aperture defining mechanism of such a system preferably is one having at least one movable element or blade which is released for movement at the commencement of an exposure cycle. This movement causes a progressive and continuous variation of aperture over the optical path of the apparatus. When the element has reached a position appropriate for a particular exposure by the control circuit, an electrical event will occur and its motion will be braked in response to the event to derive a proper aperture setting.

The mechanical assembly performing this braking function should, as far as possible, work within acceptable spring and load force values throughout an exposure cycle. Its operation must be accurate, repeatable and highly responsive to the signal output of a control circuit. Any delays encountered between the receipt of a signal from the control circuit and ultimate regulation of a signal from the control circuit and ultimate regulation of the movable aperture element must be small and controllable to achieve an accountable programmed consistency.

As the aperture defining element is halted, it is necessary to transfer the operating status of the control system to a mode suitable for properly regulating the interval of an exposure. Usually, this transfer requires the opening of a shutter mechanism and the performance of select switching functions. At the conclusion of an entire exposure sequence, all of the mechanical elements used in deriving an appropriate exposure regulation must be repositioned in a cocking maneuver in order to execute another exposure cycle. This requirement for repositioning the elements to their initial preexposure orientation calls for simplified designs providing for the performance of as many operational tasks by each individual element as possible. A resultant lessening of the number of elements required by the system ideally facilitates a design of the smaller packaging configurations desired by the photographic industry.

SUMMARY OF THE INVENTION

The present invention is addressed to a photographic exposure control mechanism operable in conjunction with a programmed control system which automatically regulates both the effective area of an exposure aperture and, in sequence, the exposure interval during which light passes through such aperture. Two electromagnets are incorporated within the control system. These electromagnets are selectively energized and deenergized by a control circuit to regulate the extent of movement of a spring loaded diaphragm assembly and, in sequence, to control the release of a shutter closing assembly following a select exposure interval.

The instant exposure mechanism and system features a mode transferring actuator member which uniquely performs several operational functions in response to an electrical event derived from a control circuit. Upon the occurrence of this electrical event, provided by the deenergization of an electromagnet, the transfer actuator member functions simultaneously first to cause a halting of the movement of an aperture defining element; second, to cause the initiation of an exposure interval; and, third, to cause the circuit of the control system to transfer from an operational mode for regulating aperture to an operational mode for regulating the exposure interval parameter. All of these functional operations are generated by a simple movement of one element. Further, the mode transfer actuator member is movable under relatively low spring loads in response to the change in energization status of an electromagnet.

To cause the arrest of movement of an aperture defining diaphragm element, the actuator member advantageously cooperates with a pivotal brake assembly requiring very low force values to initiate and maintain a braking action. This highly desired low force operation is achieved by a design in which the control movements of both abutting components of the brake assembly and actuator member are complementary. Neither element must overcome the spring force of the other during control movement. A resultant high speed and reliable dynamic response is achieved.

As the actuator member moves to effect the above braking action, one of its component branches simultaneously functions to cause the opening of a shutter to permit light to pass through the simultaneously defined aperture opening. A further branch of the transfer actuator member may be configured to actuate one or more switches so as to convert the circuit of the control system to operation in a shutter regulating mode simultaneously with the opening of a shutter assembly.

In a preferred embodiment of the invention the transfer actuator is mounted for pivotal rotation into and away from the poles of an electromagnet. As armature or keeper is pivotally coupled to a component branch or portion of the actuator and is engageable for magnetic coupling with the poles of the electromagnet when the actuator is in an initial position. The actuator is retained in its initial position during an exposure cycle by a magnetic coupling between the electromagnet and the armature. Deenergization of the electromagnet by the control circuit of the system releases this magnetic coupling, thereby permitting the actuator to rotate about its pivot away from this initial position so as to perform its multiple regulating functions. A spring loaded bias may be used for imparting an appropriately directed pivotal motion to the actuator as it is released from the electromagnet.

Another feature and object of the invention is to provide a mode transfer actuator having one component branch formed as a latch arrangement for releasably engaging the opening blade of a two-bladed shutter assembly. A second component branch of the actuator member is configured to selectively actuate a pivotal brake assembly so as to cause the arresting of the movement of an aperture defining element simultaneously with the release of the aforesaid opening blade. The actuator member of the invention may further function to simultaneously actuate one or more switches for altering the operational mode of an exposure control circuit.

Another object of the invention is to provide a mode transfer actuator which functions as a control actuator for the aperture regulating function of an exposure mechanism and as a control initiator for the shutter regulating function of an exposure mechanism.

Other objects of the invention will in part be obvious and will in part appear hereinafter.

The invention accordingly comprises the system and apparatus possessing the features, technique and properties which are exemplified in the description to follow hereinafter the scope of the application will be indicated in the appended claims.

BRIEF DESCRIPTION OF THE DRAWINGS

FIG. 1 is a diagrammatic, plan view of the aperture control assembly of an exposure mechanism according to the present invention, the various elements of the aperture regulating arrangement being shown in a preexposure or cocked position, and certain of the elements being shown in phantom illustrating their alternate positions during an exposure sequence;

FIG. 2 is a diagrammatic, plan view of the aperture control assembly of FIG. 1 showing the positions of the various elements of the assembly during an exposure sequence;

FIG. 3 is an enlarged fragmentary view showing a segment of a braking mechanism illustrated in FIGS. 1 and 2;

FIG. 4 is the fragmentary view illustrated in FIG. 3 showing, however, the orientation of the braking structure during an aperture blade arresting procedure;

FIG. 6 is a diagrammatic, plan view of an exposure mechanism according to the invention showing shutter assembly elements for use with a dual parameter control system, the various elements of the shutter assembly being shown in an initial preexposure or cocked position and portions of certain elements being shown in phantom to illustrate their orientation during a cocking maneuver;

FIG. 7 is a diagrammatic, plan view of the shutter assembly of FIG. 6 showing the position of the various elements of the shutter during an exposure interval;

FIG. 8 is a fragmentary side elevational view showing a switching component of the exposure mechanism;

FIG. 9 is a fragmentary top view showing another switching component of the exposure mechanism;

FIG. 10 is a pictorial representation of a shutter release latch incorporated within the exposure mechanism of the instant invention;

FIG. 11 is a bottom view of a portion of the mechanism of FIG. 1, showing the slideable ram linkage extending from a motor assembly to a master actuator;

DETAILED DESCRIPTION OF THE DRAWINGS

Figure 5:
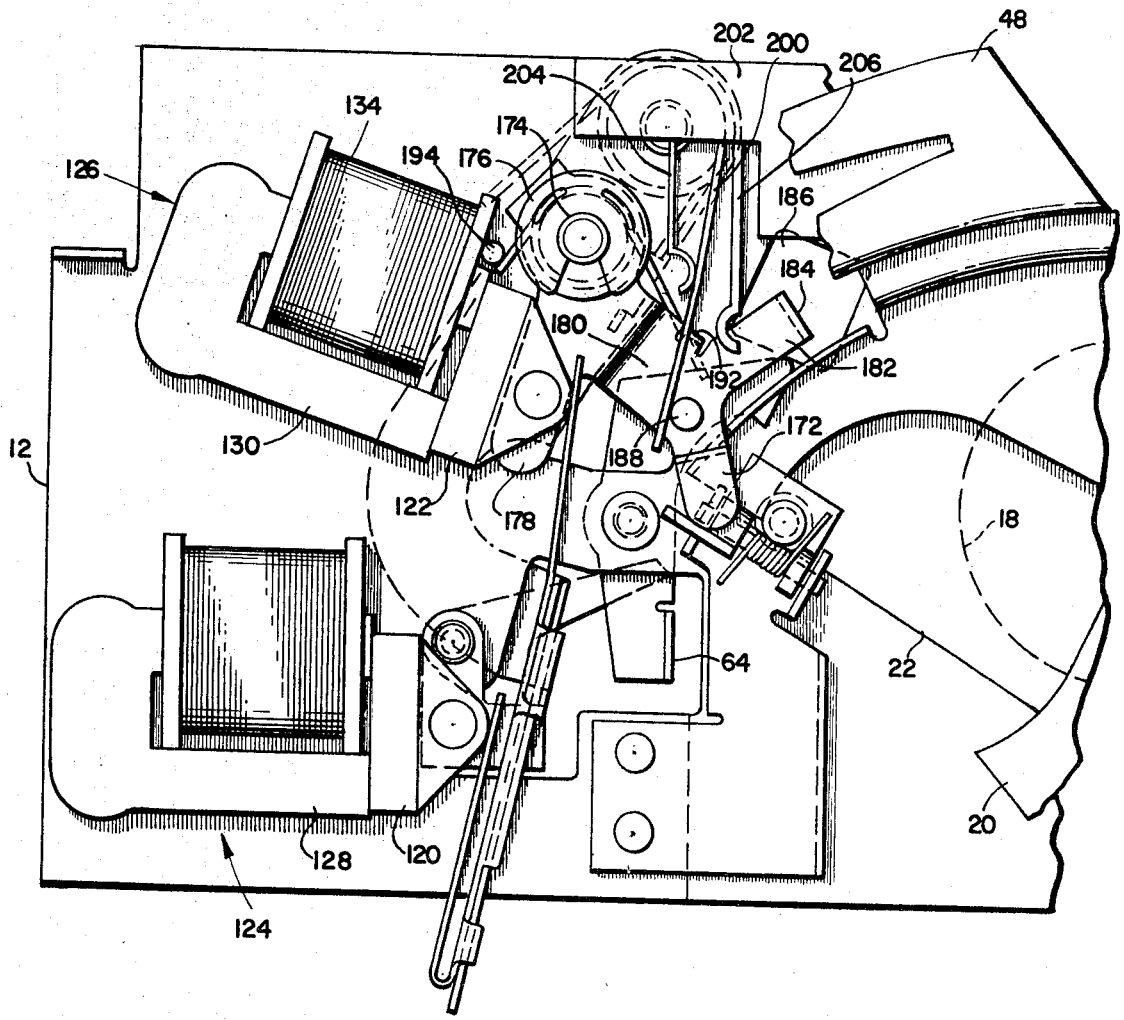
FIG. 5 is an enlarged scale, fragmentary view of a portion of the mechanism of FIG. 1.

The exposure mechanism of the invention functions as a component of a control system which responds to scene light levels in accordance with a predetermined exposure program interrelating the parameters of aperture size and exposure interval to provide exposure regulation. Control over these exposure parameters is provided sequentially, commencing with regulation of the aperture defining movement of the elements of a diaphragm assembly. Following aperture control, a shutter mechanism is actuated to produce an exposure interval responsive both to the aperture defined by the diaphragm assembly and to scene light levels. The description of the present exposure mechanism follows its mechanical operation from the commencement through the termination of an exposure, including a cocking cycle. Following the above, an electrical circuit operable to control the exposure mechanism is described, particularly with regard to its interrelationship with the mode transfer actuator member of the invention. Throughout the drawings, like reference numerals are used to denote like parts among the several figures including the schematic switching counterparts in the circuit diagrams of FIGS. 12 and 12a.

The shutter and diaphragm assemblies of the instant exposure mechanism are mounted respectively on either side of a common baseplate and are arranged thereon so as to selectively occlude light passing through a photographic optical path. Electromechanical linkages for controlling the exposure parameter assemblies are, for the most part, mounted within and upon either side of one section of the common baseplate. Certain of these linkages, including the mode transfer actuator member, will be found to function in common with both modes of exposure parameter regulation. Consequently, some of them appear in dotted form on certain of the drawings and in solid line form in drawings representing the opposite side of the baseplate. Referring to FIGS. 1 and 2, the aperture regulating assembly of the exposure mechanism is illustrated respectively in an orientation wherein the aperture blades are cocked in readiness for an exposure, and at a point in time following the commencement of an exposure sequence when an appropriate aperture has been defined. In the figures, the baseplate is identified generally at 10. Baseplate 10 is formed having two principle levels 12 and 14. These levels meet and are joined at a riser or union represented at 16. The elevational difference between base portions 12 and 14 is minimal, basically serving to accommodate the above mentioned linkages which are common to both aperture and shutter regulating operations. For the purpose of facilitating and understanding of the difference of elevations of base 10, in FIGS. 1 and 2, level 12 may be considered to be higher than level 14. Baseplate 10 is formed having a circular opening 18 coaxially aligned with the optical axis of the photographic apparatus within which the regulating mechanism is mounted. Opening 18 may be dimensioned having a diameter coextensive with the maximum aperture adjustment of the optical system. Aperture adjustment over the opening 18 is provided by a diaphragm arrangement formed by aperture defining blades or elements 20 and 22. Formed of planar, opaque material, each of the blades 20 and 22 is configured having selectively contoured indentations or notches, the edges of which are shown respectively at 24 and 26. The notches within each of the aperture blades are shaped and arranged so as to cooperate when overlapped to define aperture openings as indicated at 28, which are formed about the axis of the optical path of the photographic apparatus. Blades 20 and 22 are mounted for rotation upon the baseplate 10 at pivot studs respectively shown at 30 and 32 which extend into and are supported by baseplate 14. To provide a coaction between each of the aperture blades, externally meshing spur gears 34 and 36 are journaled respectively over the shafts of studs 30 and 32 and fixed respectively to blades 20 and 22. It will be apparent that the spur gears 34 and 36 permit a uniform synchronous and relative coaction between aperture forming blades 20 and 22. Inasmuch as the aperture blades are linked for mutually opposed rotation through gears 34 and 36, only one of the blades need be driven to impart rotation to both. Accordingly, a singular wire blade loading spring 38 is mounted within the assembly to bias the blades for oppositely directed pivotal movement. Spring 38 is slideably wound about pivot stud 30 and includes a stationary end fixed to baseplate 10 by a tab 40 extending therefrom. The flexed transitional end of spring 38 is positioned in biasing relationship against an aperture spring stud 42 secured to the surface of blade 20. Rotational force exerted by spring 38 against blade 20 serves to impose a correspondingly oppositely directed rotational force on blade 22 through the geared mechanical linkage between the blades. In the initial or cocked position of the blades depicted in FIG. 1, a minimum aperture which the blades are called upon to define is present. Of course, when in this position the blades may entirely occlude the passage of light. To provide for an adequate separation of the aperture blades from this minimum aperture position while maintaining structural compactness, semicircular indentations are formed respectively within blades 20 and 22 at 44 and 46.

A further examination of the shape of aperture blade 20 reveals an outwardly extending flange portion or vane 48 within which is formed a progressively enlarging opening or slot 50. Flange portion 48 is beveled inwardly at 52 such that its rearward surface passes in relatively close proximity to an annular mounting 54 configured to retain a light sensing element such as a photovoltaic cell or light dependent resistor. This photosensitive element is positioned within mounting 54 so as to assume an outward orientation permitting it to witness scene illumination. In this orientation the photosensitive element is positioned with respect to flange portion 48 such that the amount of scene light which it receives is regulated by the instant area of the enlarging slot 50 presented before it at any given time during an exposure sequence. Slot 50 is selectively configured for attenuating light reaching a photocell at 54 in correspondence with the aperture defining position of blades 20 and 22. With the above scanning arrangement, a control circuit operable with the mechanism of the invention may be made responsive to relative aperture and scene light during an exposure sequence.

The coacting aperture blades 20 and 22 are held in the cocked or preexposure initial position illustrated in FIG. 1 by a release latch 56. Positioned on the opposite side of base portion 12, the latch 56 is mounted for rotation about a pivotal stud 58 fixed to the baseplate. The aperture blade retaining latch is configured having a latching tip 60 extendable through an opening in riser 16. Tip 60 releasably engages blade 20 by virtue of its selective insertion within a slot positioned in an outwardly bent flange 62 formed in the upward edge of blade 20. At its opposite extremity, latch 56 is configured having an outwardly extending flange portion 64. Aperture release latch 56 is biased for rotational movement causing engagement with aperture flange 62 by a wire spring 66. Spring 66 is slideably wound about stud 58 and has one end fixed to base portion 12 and the opposite end configured to hook about the body of latch 56 (FIGS. 6 and 7). The extent of rotational travel of latch 56 is limited by the periphery of an opening in riser 16 through which its tip 60 passes.

Flange portion 64 of release latch 56 extends through an opening 68 in base portion 12 in a position suitable for permitting its coaction with loading arm 70 which functions as a master actuator. Loading arm 70 is positioned on the opposite side of base portion 12, and accordingly, is more clearly illustrated in FIGS. 6 and 7. Mounted for rotation upon and pivotal about a pivot bushing or stud 72 fixed to the base, the arm extends downwardly to a position coincident with base opening 68. The lower tip of arm 70 is bent to form a flange portion 74 which extends through opening 68. A wire spring 76, slideably wound about pivotal mount 72, functions to urge the arm 70 into pivotal movement about bushing 72 sufficient to cause the contact of its flange 74 with flange 64 of aperture release latch 56. Spring 76 is mounted having its transitional end fixed to a tab 78 formed in arm 70 and its opposite end held relatively stationary by abutment against an outward bend 80 in release bracket 106. Loading arm 70 is configured having a semicircular notch 82 for permitting its flange portion 74 to move around pivot stud 58 and under aperture release latch 56. The effective length of loading arm 70 from its pivotal mount at 72 is extended by a resilient blade spring 84 fastened to flange 74 as it extends through base opening 68. Spring 84 incorporates a downwardly protruding stem portion 86 which, in turn, is bent upwardly to form a resilient keeper contact member 88. Blade spring 84 also extends upwardly from its contact with flange 74 to form a second resilient keeper contact member 90.

As illustrated in FIGS. 1 and 6, loading arm 70 is held prior to exposure in a retracted position by a loading arm release latch 92. Latch 92 is pivotally mounted upon a stud 94 fixed, in turn, to baseplate portion 12. The latch is configured having a latching trip 96 arranged to engage a tab 98 extending from the rearward edge of loading arm 70. Latch 92 is biased for rotation toward engagement with tab 98 by a wire spring 100. Spring 100 is configured having one side abutting and biased against the mounting bracket 106 of a release button 102 and a transitional side arranged to hook over the upward edge of latch 92.

The upward edge of latch 92 is additionally shaped to include a circular cam surface 104 which is configured and arranged for cooperation with the underside release button mounting bracket 106. Release button bracket 106 is mounted copivotally with arm 70 at bushing 72. The interaction of spring 100 and camming tip 104 of latch 92 provides an upward bias against the bottom side of bracket 106 thereby imparting an upward return action to the release button 102. Upward travel of the button 102 is limited by its engagement with a tab 105 bent outwardly from baseplate portion 12. A downward extension 108 of button 102 functions to actuate a switching member $S_1$ used for energizing the circuitry of the control system.

Turning to FIG. 8, switch $S_1$ is shown to include an electrically insulated base molding 110 fixed to a tab extension 112 of baseplate portion 12. Base molding 110 supports upper and lower switch contact leaves illustrated respectively at 114 and 116. Intermediate leaves 114 and 116 is a common contact leaf 118 which is normally biased for contact with leaf 116. Common contact leaf 118 is held away from contact with leaf 116 by virtue of its engagement with extension 108 of release button 102. A depression of release button 102 causes a release of electrical contact between leaves 114 and 118 and electrical engagement between leaves 118 and 116.

Returning to the preexposure or cocked orientation of the loading arm 70 in FIG. 1, the engagement of release latch 92 with the loading arm causes the retention of the arm 70 in an orientation wherein its keeper contact members 88 and 90 respectively are in stressed contact against movable magnetic armatures or keepers 120 and 122. Keepers 120 and 122 respectively are pivotally coupled with a mode transfer actuator indicated generally at 170 and a shutter latching arm 268. As described later herein, the latter linkages permit movement of the keepers 120 and 122 into any away from abutting contact respectively with the poles of electromagnets 124 and 126. Electromagnets 124 and 126 are shown mounted within baseplate portion 12 and incorporate, respectively, pole members 128 and 130 having coil windings 132 and 134. The abutting contact or union of keepers 120 and 122 with the electromagnets represents the electromechanical interface within the exposure control system. A control circuit as described in connection with FIGS. 12 and 12a will deliver two output signals into the coils of electromagnets 124 and 126. These signals represent a selective deenergization of the coils of the electromagnets following their continuous energization as a result of the manual depression of release button 102 and the closure of contacts 118 and 116 of switch $S_1$. The mechanism of the invention uses the output of electromagnet 126 to control the setting of aperture blades 20 and 22 and to initiate the exposure interval mode of operation of the system. A deenergization of electromagnet 124 is used to signal the termination of an exposure interval.

Keepers 120 and 122 function as magnetic armatures with the electromagnets 124 and 126. To assure a proper seating of the keepers upon the electromagnets, the stressed resilient contact members 88 and 90 cause their compressive engagement against pole members 128 and 130 in the cocked orientation shown.

Looking to Figures 6 and 9, another function of loading arm 70 is revealed. When retained in the cocked position illustrated, loading arm 70 causes the closure of a switch $S_3$ having a normally open or free position. Referring to FIG. 9, switch $S_3$ is shown to be formed having an electrically insulated mounting base 136 fixed to base plate portion 14. Insulated base 136 retains two resilient contact leaves 138 and 140 in a normally open or noncontacting position. Switch $S_3$ is oriented, however, with respect to the face of loading arm 70 such that the loading arm holds the switch $S_3$ in a closed orientation while held in a retracted or preexposure position by latch 92. As seen in FIG. 9, the arm 70 functions to urge contact leaf 138 against leaf 140. To assure the electrical integrity of the switching arrangement, an electrically insulated surface shown at 142 is riveted over a portion of the contacting surface of arm 70. During shutter operation, as arm 70 is released for rotation, surface 142 will move out of engagement with contact leaf 138 and permit switch $S_3$ to open. Proper elevational alignment of the arm 70 with respect to contact leaf 138 is provided by a plastic strip 144 molded integrally with base 136 and extending along the path of travel of arm 70.

An exposure sequence is commenced with the manual depression of release button 102. As button 102 moves downward, contact leaf 118 will be permitted to close against leaf 116 of switch $S_1$ to permit the energization of electromagnets 124 and 126. When thus energized, the electromagnets 124 and 126 magnetically retain keepers 120 and 122 in abutting position against their pole members. As button 102 moves downward, its supporting bracket 106 will cam against the caming edge 104 of release latch 92 imparting rotation to it against the bias of spring 100. This rotation will result in the release of latching tip 96 from engagement with tab 98 on arm 70. Such release of arm 70 will permit its spring loaded rotation which, in turn, causes its flange end portion 74 to strike the cooperating flange 64 of aperture blade release latch 56. A resultant impact will rotate or drive latch 56 about its pivot 58 in a direction causing its latching tip 60 to disengage from flange 62 of aperture blade 20. The resultant orientations of loading arm 70, loading arm release latch 92 and aperture blade release latch 56 are illustrated in connection with FIGS. 2 and 7.

With the disengagement of aperture release latch 56 from flange 62 of aperture blade 20, aperture blades 20 and 22 will rotate under the bias of spring 38 to define a gradually enlarging aperture opening 28. With movement of blade 20, variable opening 50 in flange portion 48 will move across or "scan" a photosensitive element at 50 as to selectively attenuate scene light permitted to impinge upon element. The signal thus derived by the photosensitive element will represent a function not only of the level of light perceived but also of the relative orientation of blades 20 and 22 and, accordingly, the relative aperture defined at 28.

A consideration of the configuration and mutual interlinkage of the aperture blades 20 and 22 reveals that the blades define a continuously variable aperture rather than an incremental or stepped aperture variation as they separate under the bias of spring 38. The control system of the invention is called upon to halt this movement of the blades at an appropriate position determined in accordance with a predetermined exposure program. This function is accomplished in response to the selective deenergization of electromagnet 126.

Looking initially to the function of halting the motion of the blades at an appropriate aperture, a mechanical braking arrangement shown generally at 150 is mounted upon baseplate 12. Since the aperture blades 20 and 22 are mutually linked by gears 34 and 36, the braking arrangement 150 need work with only one of the blades, for instance, blade 22. The braking system is fully described and illustrated in a copending application for U.S. Pat., Ser. No. 784,064 by Lawrence M. Douglas, entitled "Aperture Defining Exposure Control System," owned in common herewith and filed Dec. 16, 1968.

Referring to FIGS. 1, 3 and 5, braking arrangement 150 is illustrated in a retracted orientation permitting the free pivotal movement of aperture blades 20 and 22. The brake comprises a mounting bracket 152 fixed to baseplate portion 14 by rivets or the like as at 154. Mounting bracket 152 is configured to position the braking elements of the arrangement a select distance from the surface of aperture blade 22. Bracket 152 is structured to support an axle 156 in a plane parallel with the surface of aperture blade 22. Pivotally mounted upon axle 156 is a braking member or component formed having a lever portion 158 extending from axle 156 towards the surface of blade 22 and an integrally connected retracting portion 160 extending oppositely therefrom.

Lever portion 158 is configured having a length greater than the selected distance from axle 156 to the surface of blade 22. A central opening is formed within the braking member to permit the insertion of a wire spring 162. Spring 162 is configured and arranged to bias lever portion 158 towards the surface of aperture blade 122. Toward the outer tip of lever portion 158 an opening is formed in the braking member which functions to retain a cylindrically shaped insert 164 formed of a brakeshoe material having a relatively high coefficient of kinetic friction with respect to the material from which the blade 22 is formed.

As illustrated in FIG. 4, braking action is provided with brake 150 by permitting lever portion 158 to pivot inwardly toward aperture blade 22. This action functions to wedge the blade 22 against the surface of baseplate portion 14. During periods of energization of the electromagnet 126, brake assembly 150 is held in the position illustrated in FIG. 3.

To associate the energization status of electromagnet 126 with the function of brake assembly 150, a changeover arm 170 is installed upon baseplate portion 12. Changeover arm 170 functions as a mode transfer actuator member inasmuch as it not only functions to selectively control brake assembly 150 but also operates to initiate exposure interval regulation as well as to provide a necessary switching function for the control circuit of the exposure control system.

Referring to FIGS. 1 and 5, the changeover arm 170 is shown mounted upon the aperture blade side of baseplate portion 12 in an initial position. This position is maintained while the mechanism is cocked and during periods of energization of electromagnet 126 by virtue of its pivotal connection with armature 122. Armature 122 is connected with the changeover arm by a coupling at one of its component branches identified at 178. Armature 122 is positioned upon branch 178 so as to be movable into and away from an abutting position against the pole members 130 of electromagnet 126. A second component branch 180 of the changeover arm extends from the pivotal connection of the arm at 174 angularly away from branch 178 to define a braking tip 172. Tip 172 cooperates with retraction portion 160 of braking assembly 150 to selectively hold the brake insert 164 away from contact with aperture blade 122. The interaction of tip 172 with the retracting portion 160 of the brake assembly is illustrated in more detail in FIGS. 3 and 4. Note in this regard that only a minor pivotal movement of the keeper 122 and branch 178 from the electromagnet 126 will cause the braking assembly 150 to pivot into the full braking position shown in FIG. 4. Such a resultant rapid response rate is highly desirable in the present system. Component branch 180 is further structured having an integrally formed third component branch 182 extending upwardly from a position near tip 172. Branch 182 terminates in a flanged tip portion 184 which extends through an opening 186 in baseplate portion 14. Flange 184 provides an exposure control function on the opposite side of the baseplate assembly. As described later, tip 184 functions to control the initiation of a shutter mode function. Component branch 180 also supports an electrically insulative cylindrical bearing member 188 which extends outwardly from its surface. A rotational bias away from engagement with electromagnet 126 is exerted over the changeover arm by a wire spring 190. Spring 190 is slideably mounted over stud 174 and has a transitional end which abuts against a tab 192 extending from branch 180 and a stationary end which abuts against a tab 194 on the baseplate.

During an exposure sequence, the loading arm 70 is rotated such that contact member 90 is no longer in contact with keeper 122 and the latter element is magnetically retained in abutting position against pole member 130 until such time as coil 134 is deenergized. At the instant of this deenergization, changeover arm 170 rotates so as to cause braking top 172 to release brake 150 and simultaneously elevate flange 184. The released position of arm 170 is illustrated in FIG. 2. Cylindrical bearing member 190 on changeover arm 170 is positioned in operative relationship with the common contact leaf 200 of a dual terminal switch S₂. Switch S₂ includes an insulative mounting base 202 mounted upon baseplate 10. Common contact leaf 200 extends sufficiently over changeover arm 170 to contact and bear against cylindrical bearing member 188. In the orientations of FIGS. 1 and 5, common contact leaf 200 is held against leaf 204 of switch S₂ by virtue of its abutment against cylindrical bearing member 188. As changeover arm 170 is permitted to rotate, common contact 200, by virtue of its preselected spring bias, is allowed to move into contact against leaf 206 as illustrated in FIG. 2. Switch S₂ will be seen to serve in a mode transfer function for the circuit of the exposure control system. Changeover arm 170 maneuvers the switch from one contact orientation to another at the proper instant and in proper sequence to effect this mode transfer.

In response to the deenergization of electromagnet 126, the changeover arm 170 will not only have caused the braking of aperture blades 20 and 22 but also will have caused the initiation of exposure interval regulation. A shutter mechanism responding to the movement of changeover arm 170 is portrayed in connection with FIGS. 6 and 7, these figures representing an opposite side of the baseplate 10 assembly heretofore discussed. In FIG. 6, the shutter mechanism is shown in a cocked, preexposure orientation, while in FIG. 7 the shutter mechanism is depicted in a status assumed while terminating an exposure interval.

The shutter portrayed in the figures is one of a variety utilizing a pair of opaque, planar shutter blades. These blades are configured in an arrangement for sequentially covering and uncovering the optical path of photographic camera. At the commencement of an exposure interval, a first of these blades, termed the "opening blade," moves to a position causing the unblocking of the optical path of the camera. Following an appropriately timed interval of exposure, a second blade termed the "closing blade" is released to a position causing a covering of the optical path. An exposure interval is derived as the time elapsed between the opening and closing of the shutter blades and is controlled by the timed release of the closing blade in accordance with the control system program. The electrical event providing for the release of the closing blade is that of a change in energization level or status of electromagnet 124. Initiation of exposure interval is provided by the electrical event representing the deenergization of electromagnet 126.

The opening blade of the shutter assembly is illustrated at 230 and is configured as a wedge-shaped segment of a circle, the apex of the wedge being mounted for rotation about pivotal stud 232 depending from baseplate portion 14. As illustrated in the cocked portrayal of the shutter mechanism of FIG. 6, blade 230 is configured having a planar, opaque portion extensible over the opening 18 of the exposure mechanism optical path. The planar face of opening blade 230 also is formed having an annular opening 234 of at least equal diameter with opening 18. Openings 234 and 18 are oriented having equal radial spacing from the pivot at stud 232. Positioned over and mounted coaxially with the opening blade 230 is a planar, opaque closing blade 236 configured coradially with the outward edge of blade 230 and having a surface area sufficient to occlude light passing through opening 234 when it is rotated into appropriate position. A retainer ring 238 is positioned over stud 232 to maintain the blades in position thereupon. With the configuration described, the blades 230 and 236 will selectively occlude light passing through optical path opening 18 as they are rotated about their mutual pivot at 232. To provide for the rotation of the blades during an exposure, each is biased for codirectional rotation by a spring. For instance, blade 230 is biased for rotation into its orientation shown in FIG. 7 by a wire spring 240 centrally wound about a spring hanger 232. Spring 240 has a stationary side, the tip of which bears against ledge 244 of a spring tension adjustment comb 246. A translational side of the spring 240 is shown extending from hanger 242 to assert a rotational force upon opening blade 230 through pressure exerted against a radial flange 248 formed integrally with the blade. Closing blade 236 is biased for rotation about pivot 232 by a wire spring 250. Spring 250 is slideably wound about a spring hanger 252. The stationary side of spring 250 is retained within a selected notch as at 245 formed within comb 256. A transitional side of spring 250 is connected to a radial edge of closing blade 236 by a tab member 256 extending from its lowermost edge. Thus tensioned between comb 246 and tab 256, the spring 250 functions to bias the closing blade 236 for rotation codirectional with blade 230. Opening blade 230 and closing blade 236 are retained in a preexposure, cocked orientation by virtue of their engagement respectively with flange 184 of changeover arm 170 and a closing blade release latch 258. Flange 184 of changeover arm 170 is illustrated extending from the opposite side of baseplate 10 through rectangular opening 186. In cocked orientation, the flange 184 abuts against the forward edge of a tab 260 protruding outwardly and radially from the curved upper edge of opening blade 230. The tab 260 is also configured having an outwardly bent flange portion 262 which cooperates in abutting relationship with a corresponding notch 264 formed within closing blade 236. Closing blade release latch 258, pictured separately in FIG. 10, is mounted for rotation upon an axle 266 fixed to the baseplate at one side of opening 68. Latch 258 is configured to straddle baseplate portion 12, one side forming a latching arm 268, a tip of which is arranged to abut against a corresponding flange 270 formed in an outer edge of closing blade 236. The opposite side 272 of latch 258 is provided with an annular opening 274 adapted to receive a connector for providing pivotal connection with armature 120. When armature 120 is positioned in abutting contact with electromagnet 124 either by virtue of the energization of the electromagnet or by contact member 88 of loading arm 70, latching arm 268 of the latch 258 functions to retain the closing blade in the standby orientation shown in FIG. 6. Because of its particular configuration, the latch will permit the commencement of a closing movement of blade 236 at the instant of release of armature 120 from electromagnet 124. It will be apparent that the release pivotal movement of latching arm 268 complements the release movement of blade 236. Such an arrangement provides for an improved response of the shutter mechanism to change in the status of energization of electromagnet 124.

An exposure interval is commenced with the deenergization of electromagnet 126 in response to an output signal of a control circuit. This signal is inserted into the exposure mechanism by causing a deenergization of electromagnet 126. As discussed above, a deenergization of this electromagnet will permit changeover arm 170 to rotate under the bias of its spring 190 and, in turn, cause the elevation of flange 184 formed in component branch 182 of the arm. The resultant position of this flange is shown in FIGS. 2 and 7. The lifting of flange tip portion 184 of the changeover arm 170 will cause the release of its engagement with tab 260 of opening blade 230. As a result, the blade will move to a position permitting the initiation of an exposure through the previously regulated aperture assembly. Turning to FIGS. 6 and 7, the orientation of blade 230 respectively before and during an exposure interval are portrayed. As blade 230 rotates under the bias of spring 240, the forward striking surface 276 of a flange 278 formed at the edge of blade 230 moves in an arcuate path towards tripping engagement with a spring loaded switch actuating assembly shown generally at 280. Assembly 280 includes a switch actuating lever 282 mounted for rotation about pivot pin 284 and held in position by retainer ring 286. Lever 282, as viewed in FIGS. 6 and 7, is biased for clockwise rotation by a wire spring 288. Spring 288 is slideably wound about pivot pin 284 and is arranged having a stationary end abutting against a tab 290 depending from baseplate portion 14 and a transitional end abutting against a tab 292 bent outwardly from lever 282. One end of lever 282 supports a cylindrical, electrically insulative bearing member 294 which functions to actuate switches $S_4$ and $S_5$. The other side of lever 282 is formed to define two leg portions 296 and 298 bent, respectively, at 300 and 302 to elevate their outer tip areas. An escape leaf 304 is pivotally mounted on a stud 306 depending from the elevated tip portion of leg 296. The pivotal connection is completed by a retainer ring 308 positioned over the leaf 304 and stud 306. Fixed to the underside of leaf 304, a push stud 310 is positioned to provide for selective abutment against one edge of a notch 312 formed in the elevated tip of leg portion 298. A U-shped wire spring 314 having one side fixed to leaf 304 by tabs 316 and the other side stressed to abut against an upwardly bent wall forming the bend 302 in tip 298, functions to bias push stud 310 against the wall of notch 312. Escape leaf 304 is additionally configured having a striking tip 318 fashioned by bending inwardly a flange portion formed oppositely from stud 306.

Assembly 280 is held in an orientation illustrated in FIG. 6 as a result of the abutment of push stud 310 against the inwardly facing upward edge 320 of a shutter recocking arm 322. Edge 320 is formed in arm 322 just above a slot 324 configured and dimensioned having a width sufficient to permit the slideable insertion of push stud 310. Assembly 280 is maintained in the preexposure orientation illustrated in FIG. 6 by virtue of the rotative force exerted by spring 288 which is counteracted by edge 320 of arm 322.

The preexposure orientation of the assembly 280 provides for a select switching configuration at switches $S_4$ and $S_5$. These switches are formed having an electrically insulative mounting base 330 fixed in appropriate position upon baseplate portion 14. Base 330 supports a first switching arrangement $S_4$, including upper and lower contact leaves shown respectively at 332 and 334. Between the latter contact leaves is a common contact member 336 engageable with bearing member 294 of assembly 280 and resiliently biased for contact with leaf 334 upon the downward rotation of member 294. Beneath the first switching arrangement, base 330 supports a second switching arrangement $S_5$, formed of upper contact leaf 338 and lower leaf 340. The latter switching leaves are resilient and mounted in a normally open or free configuration. Upper contact leaf 338 is configured having a length sufficient to permit its engagement with a lower portion of cylindrical bearing member 294. As a consequence, with the downward rotation of assembly 280, switch leaves 338 and 340 will be brought into engagement. An electrically insulative pin 342 extending from baseplate portion 14 limits the downward travel of contact leaves 338 and 340 as well as the rotational travel of assembly 280.

When released shutter blade 230 rotates, the forward striking surface 276 of flange 278 will strike the tip 318 of the escape leaf 304. As a result, the leaf 304 will be pivoted downward against the bias of spring 314 until push stud 310 is aligned with the opening of notch 312 formed within recocking arm 322. When this orientation is reached, assembly 280 will rotate under the bias of spring 288 and push stud 310 will move toward the back edge of notch 312. When this activity has occurred, assembly 280 will have adjusted to the orientation illustrated in FIG. 7 wherein contact leaves 336 and 334 of switch $S_4$ have been permitted to close and bearing member 294 has caused closure of switch $S_5$ contact leaves 338 and 340. As striking surface 276 of blade 230 strikes tip 318, the opening blade will be brought to a gradual halt, its motion terminating when the forward edge of blade extension 350 comes in contact with an arresting tab 352 extending from baseplate portion 14. The latter position of blade 230 permits the uncovering of the optical path by bringing annular opening 234 substantially into registry with opening 18.

This open orientation of the shutter mechanism will continue until such time as armature 120 is released from electromagnet 124. It follows, therefore, that the deenergization of electromagnet 124 terminates and exposure interval. As armature 120 is released, the force exerted by closing blade spring 250 will cause the simultaneous upward pivotal motion of both blade 236 and closing blade release latch 258. An orientation of the shutter components at such an instant is shown in FIG. 7. Blade 236 will continue to pivot until its notch 264 engages and abuts against outwardly bent flange portion 262 of opening blade 230. When so oriented, closing blade 236 will entirely cover openings 18 and 234 to terminate an exposure interval.

As has been alluded to earlier in the description, the exposure mechanism operates in conjunction with a control circuit which provides output signals functioning to control the actuation of the elements of the mechanism. Further, elements such as the changeover arm 170 perform a feedback function permitting the control circuit to operate sequentially, first in an aperture regulating mode and then in a shutter regulating mode.

Figures 12, 12A:
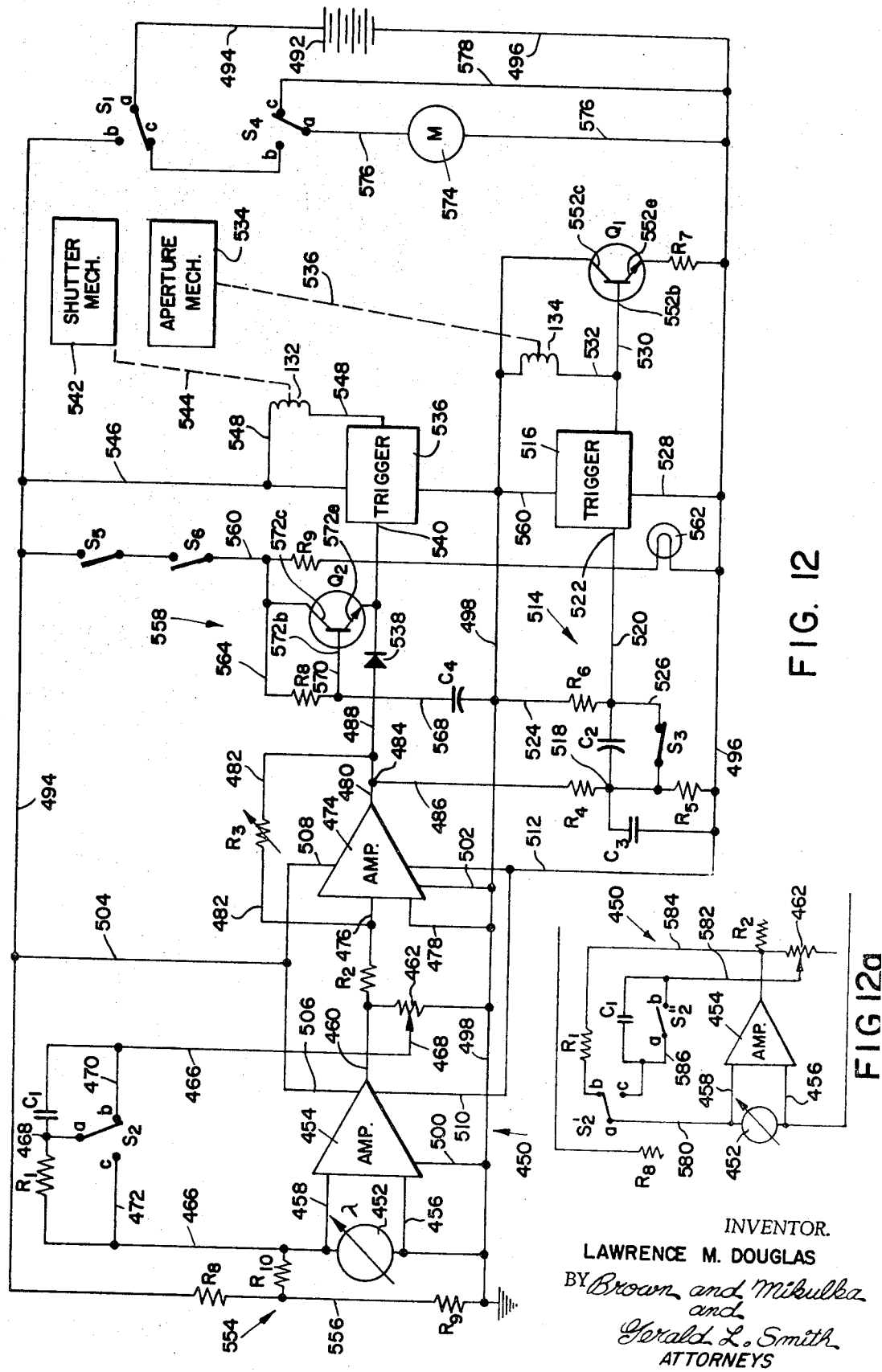
FIG. 12 is a schematic circuit diagram of an electrical circuit operative in association with the exposure control mechanism of the invention.
FIG. 12a is a fragmentary view of the schematic circuit diagram of FIG. 12 showing an alternate switching embodiment.

Referring to FIG. 12, control circuit which may be used with the above-described exposure mechanism is illustrated. This circuit provides for control of the aperture and shutter regulating mechanism in accordance with a predetermined exposure program, for instance, one in which aperture and exposure interval parameters are related to variations in scene light level values in a proportion of less than 1:1. A detailed description of the circuit may be found in a copending U.S. application for Pat., Ser. No. (Our Case 837,688) entitled "Exposure Control System" by John P. Burgarella, filed concurrently with the instant application and having a common assignee.

The control system evaluates scene light levels with a light sensing circuit shown generally at 450. Circuit 450 includes a photovoltaic cell 452 which may be positioned within annular mounting 54, as earlier described, and oriented to evaluate light levels of a scene coincident with the field of view of the lens system of the photographic apparatus. This cell operates in conjunction with the earlier described progressively enlarging opening 50 of flange portion or vane 48 formed within aperture blade 20. Accordingly, scene light reaching the cell 452 is altered in synchronism and corresponding variation with the adjustment of aperture size. Cell 452 is coupled with an amplifier stage 454 from along input lines 456 and 458. The amplifier 454 is one sometimes referred to in the art as an "operational amplifier." For the present application it is of a differential variety permitting its fabrication in practical, miniaturized form. When considered ideally, the amplifier 454 has an infinite gain and infinite input impedance and a zero output impedance. By virtue of a feedback path between the output 460 of amplifier 454 and its input, the cell 452 may operate into an apparent low input impedance. The feedback path arrangement includes a potentiometer 462 having a wiper arm 464 connected to line 466. Potentiometer 462 provides a trimming function for exposure interval timing operations. Feedback path line 466 is coupled with a timing capacitor $C_1$ and with a feedback resistor $R_1$. To provide for the exclusive insertion of feedback resistor $R_1$ into the feedback path 466 during an aperture regulating mode of operation, a two-position switch $S_2$ is coupled from junction 468 and bypass line 470 by joining its contacts "$a$" and "$b$". In an exposure interval regulating mode of operation, the common contact terminal of switch $S_2$ is closed between terminals "$a$" and "$c$," thereby inserting a line 472 to bypass resistor $R_1$. Since cell 452 operates in conjunction with a low input impedance, it is permitted to function in a current mode and its output current permits the generation of a voltage across the feedback resistor $R_1$ which is witnessed at the output line 460. The voltage signal present at output line 460 of the light sensing circuitry is introduced through a calibrating resistor $R_2$ to a second amplification stage 474. Amplifier 474 may be structured identically with the operational amplifier 454 of the light sensitive circuitry 450. Accordingly, it is of a differential variety having input lines 476 and 478 and an output at 480. A feedback path including line 480 and a variable resistor $R_3$ is connected between the output 480 and input line 476 of the amplifier. Variable resistor $R_3$ provides a means for varying the gain of amplifier 474. Accordingly, the resistor $R_3$ may be used to adjust the level of the output signal of light sensing circuitry 450 in accordance with the sensitometric properties of the film or photosensitive material being used with the exposure control system. Indicia may be provided with the wiper arm of the resistor for indicating proper settings corresponding to a variety of film speeds.

Having been adjusted at the amplification stage 474, the light responsive signal at output 480 is present at a common output terminal 484 to which is coupled parallel output lines 486 and 488.

Power supply to the above-described light sensing circuitry 450 and second amplification stage 474 is derived from a DC source such as a battery 492, the positive and negative terminals of which are coupled respectively to positive and negative bus lines 494 and 496. Electrical energy is supplied into the latter bus lines by closure of the common terminal of switch $S_1$ between its contacts "a—b." The differential amplification states 454 and 474 require the presence of a reference level or ground. This ground level is derived along a third bus line shown at 498. Note that amplifiers 454 and 474 respectively are connected with reference level bus 498 from along lines 500 and 502, to bus 494 from line 504 and its branches 506 and 508, and to bus 496 from lines 510 and 512.

When the control system is operated to regulate the aperture mechanism, the output signal at common output terminal 484 will represent both the illumination on photovoltaic cell 452 and the relative orientation of aperture blades 20 and 22. This signal is presented from along line 486 to an adjusting circuit the signal such that it may function to fire a voltage sensitive trigger circuit shown generally at 516 in accordance with a predetermined exposure program selectively interrelating aperture and exposure interval in accordance with scene light. An exemplary program is one described and illustrated in the above-referenced copending application of John P. Burgarella.

The adjustment provided by subsidiary circuit 514 is one which joins the light sensitive circuit from line 486 with a ramp signal. As a prelude to the operation of circuit 514, however, the brightness signal from line 486 must be scaled so as to be capable of functioning with the triggering level for voltage sensitive circuit 516. This firing or triggering level is generally about one-half of the voltage between buses 496 and 498. For the brightness signal from line 486 to be used in conjunction with trigger circuit 516, a DC level shift must be provided. In this regard, note that the output of amplifier 474 is at the ground reference level of bus 498 and the triggering level for the circuit 516 is at a voltage value substantially below the ground reference. To provide the requisite level shift, a pair of resistors $R_4$ and $R_5$ are incorporated in line 486 between common terminal 484 and bus 496. These resistors are chosen having resistance values such that a voltage is provided at junction 518 between them which is substantially smaller than the triggering level established at the triggering circuit 516. With such an arrangement, a signal passing through the amplification stage 474 will go positive with respect to the ground and will appear in attenuated or scale-down form at junction 518. A line 520 couples a capacitor $C_2$ between junction 518 and an input terminal 522 of trigger circuit 516. A resistor $R_6$ is coupled between line 520 and bus 598 by line 524. Capacitor $C_2$ is selectively bypassed by shunt path 526 incorporating a normally closed switch $S_3$. When switch $S_3$ is open, capacitor $C_2$ is charged through resistor $R_6$ by a signal representing an association or addition of the scaled brightness level signal and a ramp signal. It will be apparent that resistors $R_4$ and $R_5$ form part of the return path for the charging signal and that the charging signal through resistor $R_6$ is additive with respect to the brightness signal at junction 518. To provide addition of the above signals, the initiation of the charging sequence on capacitor $C_2$ must be coincident with the initiation of the scanning of photocell 452 by the slot 50 within vane 48 of aperture blade 20.

This operation is performed in the exposure mechanism of the invention by the cooperative arrangement of switch $S_3$ in loading arm 70 as described in connection with FIGS. 6, 7 and 8. During a recocking sequence, the arm 70 is returned to its preexposure orientation wherein it is held in position by release latch 92. This orientation provides for the reclosing of switch $S_3$ as the insulative surface 142 of arm 70 moves under and recontacts contact leaf 138. Such closure serves the function of resetting capacitor $C_2$ for sequential operation.

The voltage buildup at capacitor $C_2$ is presented along line 520 to the input terminal 522 of trigger circuit 516. Circuit 516 may be of a Schmitt-type trigger circuit which has an input that is a normally nonconducting stage and an output which is a normally conducting stage. When the entire circuit is energized from battery 492 through the closure of the contact of switch $S_1$ between terminals "a" and "b," the output stage of trigger circuit 516 will permit current to continuously flow through coil 135 between buses 496 and 498 through the path including lines 528, 530 and 532. Coil 134 has been described earlier as a component of electromagnet 126 which functions to selectively retain keeper 172 of changeover arm 170 in a prebraking position. When coil 134 is deenergized, the changeover arm 170 is permitted to rotate and actuate brake assembly 150. The functional coupling of coil 134 with the aperture mechanism depicted in block fashion at 534 is indicated by dashed linkage 536. When the normally nonconducting stage of trigger circuit 516 receives a signal at terminal 522 which has reached a predetermined threshold value, the trigger circuit 516 will cause its normally conducting stage to switch to nonconducting status. As a result, coil 134 will be deenergized to permit the changeover arm 170 to control the aperture mechanism. The deenergization of coil 134 also permits the changeover arm 170 to convert the exposure mechanism and control circuit to operation in an exposure interval regulating mode. At the commencement of shutter interval regulation, changeover arm 170 will have caused the common contact 200 of switch $S_2$ to move into contact with leaf 206. This switching adjustment is represented in FIG. 12 as a movement of the contact terminal of switch $S_2$ to a position uniting terminals "a" and "b." The contact member of switch $S_1$ remains in an orientation coupling terminals "a" and "b" throughout the regulation of an exposure interval. As discussed earlier, changeover arm 170 provides the additional function of releasing the opening blade 230 of the shutter assembly to initiate an exposure interval.

At the commencement of exposure interval timing, photocell 452 is in a status wherein it has been scanned by the opening 50 in the vane 48 of aperture blade 20. Accordingly, cell 452 will generate an output signal which is responsive both to the earlier selected aperture and to the light level of a scene. This output signal ultimately is used to determine the exposure interval defined between the uncovering of the aperture by shutter blade 230 and its covering by shutter blade 236. When operated to determine the exposure interval parameter, the feedback path 466 of light sensitive circuitry 450 excludes resistor $R_1$ and includes capacitor $C_1$. This alteration is provided with the actuation of switch $S_2$. Appropriate switching action is provided by changeover arm 170 in a movement also causing the release of shutter opening blade 230. With the capacitor feedback arrangement, photovoltaic cell 452 is permitted to operate in a current mode, a current generated by the cell being limited substantially by its own internal impedance. Under such loading, the photovoltaic cell 452 is capable of forming a desirable linear output in response to scene lighting. During operation, any difference of potential supplied by the photovoltaic cell 452 across input lead 456 and 458 will operate to cause a voltage to be produced at feedback path line 466 of opposite polarity to the voltage at line 458 (or the output end of capacitor $C_1$). As a consequence, the feedback path provides a substantially instantaneous feedback signal of opposite polarity which serves to counteract any differential signal voltage impressed by cell 452 across the input terminals 456 and 458. The relatively low signal voltages at the input of amplifier 454 which are present with the relatively low signal current deriving from photovoltaic cell 452 are acted upon by the correspondingly high gain characteristic of the amplifier. Thus, although the amplifier 454 has a high input impedance, the photocell 452, when connected in the system described, experiences only very low impedance. Therefore, the current output of the photovoltaic cell 452 is directed into the feedback path.

The potentiometer arrangement at 462 provides a trimming function for the exposure interval timing parameter. In this regard the wiper arm 464 may be arranged to be manually adjusted by an operator to insert a lighten or darken adjustment into the system. Inasmuch as the potentiometer 462 is inserted between the output line 460 and reference level 498, the voltage buildup at the output of the amplifier 454 will be varied in accordance with the position of wiper arm 464. The signal present at output 460 of the light sensing circuitry is introduced through calibrating resistor $R_2$ into the second amplification state 474. At stage 474, the gain of the signal is adjusted, as before, in accordance with the sensitometric properties of the photosensitive material being used with the exposure control system. Note in this regard that the second amplification stage 474 functions with both operational modes of the control system. Generally, resistor $R_2$ is selected for calibrating the exposure interval control portion of the system. This control parameter is determined with respect to a previously automatically selected aperture opening and any minor variation in aperture from the program will be accommodated for by the calibrated exposure interval control. Accordingly, adequate exposure precision is maintained with the precise recalibration of only the exposure interval parameter circuit. For calibration purposes, resistor $R_2$ may be selected having a value accommodating any tolerances in sensitivity of the photovoltaic cell 452, tolerances in the capacitance values of capacitor $C_1$ or in the exposure interval voltage sensitive triggering circuit.

From the second amplification stage 474, the light responsive signal is directed from common output terminal 484 through line 488 for introduction to a voltage sensitive trigger circuit depicted generally at block 536. Inasmuch as trigger circuits 516 and 536 are driven from a single source, means must be provided to assure their energization in proper sequence. The sequencing of their operation is achieved by raising the voltage level required for firing trigger circuit 536. This level adjustment is accomplished by the insertion of a diode 538 in path 488. Diode 538 functions in a conventional manner to drain off a portion of the voltage signal present in path 488. It is preferred that the diode 538 be of a solid-state silicon variety inasmuch as this form requires about one-half volt threshold signal before assuming a substantially fully conductive state. The diode further functions to accommodate for any circuit excursions which may cause the inadvertent firing of trigger circuit 536.

Somewhat similar to trigger circuit 516, trigger circuit 536 is a Schmitt-type which permits the continuous energization of coil 132 until the receipt at its input terminal 450 of a signal of predetermined level. Coil 132 will be recognized as a component of electromagnet 124. When energized during an exposure sequence, the coil 132 will cause the retention of keeper 120 in abutting contact with the poles of electromagnet 124 and, as a result, retain the shutter closing blade 236 in an orientation permitting the passage of light through the exposure aperture. The electromechanical linkage between coil 132 and the shutter mechanism shown in functional block form at 542 is depicted by dashed line 544. Trigger circuit 546 is formed having an output stage that is normally conducting and permits the passage of current between buses 494 and 498 from along lines 546, 548 and 550. The circuit 546 also includes a normally not conducting stage which upon receipt of a signal of predetermined threshold value at terminal 540 causes the switching of the normally conducting stage to a nonconducting status. This switching action deenergizes coil 132 permitting electromagnet 124 to cause the release of shutter closing blade 236. Power switch $S_1$ remains closed to maintain the electrical union of its terminals "a" and "b" throughout the exposure interval regulating operation of the circuit by virtue of the continued depression of release button 102.

Attention is now turned to the orientation within the control circuit of the two identical Schmitt-type triggering circuits 516 and 536. The symmetrical arrangement of these circuits across the power supply permits the establishment of the reference or ground level of bus 498 without the use of a tapped power supply. This form of power supply would otherwise be required for the operation of differential amplifier stages 454 and 474. The balance of ground level bus 498 between power buses 494 and 496 is maintained as long as the normally conducting stages of circuits 516 and 536 are active or in a conductive state and the coils 134 and 132 respectively coupled with them are energized. During an exposure sequence, however, circuit 516 will be triggered to deenergize coil 134 before circuit 536 is triggered. Without a form of compensation in the circuit 516, the symmetrical arrangement between buses 494 and 496 will be interrupted and negate the reference level contribution of bus 498. To compensate for the change in state of coil 134, a transistor $Q_1$ and resistor $R_7$ are coupled between ground bus 498 and bus 496 to form a bypass across coil 134 and the normally conducting stage of trigger circuit 516. Transistor $Q_1$ is formed having base, emitter and collector electrodes, respectively at 552b, 552e and 552c. The base 552b of transistor $Q_1$ is coupled to one side of coil 134 at line 530, its collector electrode 552c is coupled to bus 498 and its emitter electrode 552e is coupled with resistor $R_7$ to bus 496. Thusly coupled, the transistor $Q_1$ and resistor $R_{12}$ constitute an emitter-follower arrangement with the normally conducting stage of circuit 516. During the energization of coil 134, a low voltage line 530 will maintain transistor $Q_1$ in a nonconducting status. As the circuit 516 is triggered and coil 134 is deenergized, the voltage level at line 530 will begin to rise. This voltage is present at the base 552b of transistor $Q_1$. As it reaches an appropriate level, conduction will be permitted at the base-emitter junction of transistor $Q_1$ to shunt current otherwise passing through coil 134 through the bypass circuit. A silicon variety of transistor is recommended for use as transistor $Q_1$ inasmuch as its threshold operational characteristics permit it to remain inoperative during the conduction of the normally conductive state of trigger circuit 516. Resistor $R_7$ is selected having a value somewhat equivalent to the resistance imposed at the coil 134.

As switch $S_1$ is closed to supply power to the entire control circuit, it is necessary that trigger circuit 516 be in appropriate alignment such that its normally conducting stage will immediately conduct. Since the trigger circuit may assume a somewhat random status following an exposure, it is preferred to insert a means for aligning it concurrently with the closing of the contact of switch $S_1$ against its terminals "a" and "b." Such alignment is provided by a capacitor $C_3$ inserted between junction 518 and power bus 496. Capacitor $C_3$ will cause the input 522 of circuit 516 to be held momentarily at the minus potential of bus 496.

Operational amplifiers such as depicted at 454 typically require the presence of a small biasing current at their input terminals in order to provide a more accurate and effective operation. Such a biasing current is purposely inserted into the input side of the amplifier 454 to an attenuation network indicated generally at 554. Network 554 includes resistors $R_8$, $R_9$ and $R_{10}$. Resistors $R_8$ and $R_9$ are coupled on line 556 extending between bus 494 and bus 498. Resistor $R_{10}$ is coupled from a junction between resistors $R_8$ and $R_9$ to line 466 between line 458 and line 472. The resistance values within network 545 are selected so as to insert a low threshold level bias current into the amplifier 454. The insertion of a low bias current is effective to broaden photosensitive characteristics of the exposure control system. Since the photovoltaic cell 452 may be called upon to detect very low light levels, the biasing current inserted by the network will permit substantially all of the signal current generated by the photocell to be inserted into the feedback path of amplifier 454. Without the biasing current supplied by the network, such very low level signals would be drawn to the amplifier rather than to the feedback path.

The circuit arrangement thus far described is structured to provide automatic exposure control under conventional ambient illumination. For transient scene illumination, such as that supplied by flashbulbs and the like, an auxiliary timing network is incorporated within the circuitry in supplement with the ambient mode circuitry. This network is indicated generally at 558. The control system circuitry is prepared for making a flash exposure by manually setting a switch as at $S_6$ to a closed position. Switch $S_6$ is connected with line 560 between power supply buses 494 and 498. Connected in series with switch $S_6$ is a flashbulb or the like 562.

The fixed exposure interval provided by the network 558 is selected so as to permit the shutter to remain open, for instance, over the light generating period of a flashbulb. Under more normal conditions of flash illumination, the exposure interval will be terminated by the photosensing circuitry of the control system before the time period defined by network 558 is reached, hence the term "auxiliary timing network."

For the control circuitry and the exposure mechanism to operate with flashbulb illumination, trigger circuit 516 must be fired to release changeover arm 170 and, as a result, shutter opening blade 230. Under conditions of illumination wherein the signal derived from light sensing circuit 450 is inadequate in and of itself to fire the trigger circuit, capacitor $C_2$ is called upon to fire circuit 516 after an interval permitting aperture blades 20 and 22 to open to their full extent, for instance about 25 milliseconds. Capacitor $C_2$ is charged to an appropriate triggering voltage by the earlier discussed ramp signal through line 524 and resistor $R_6$. Resistor $R_6$ and capacitor $C_2$ are linked to form an R-C timing circuit, voltage buildup from which is presented to the input terminal 522.

As discussed in connection with FIG. 7, the opening movement of blade 230 will cause the actuating assembly 280 to close contact leaves 338 and 340 of a switch $S_5$. With the closing of switch $S_5$, flashbulb 562 is fired. The closing of switch $S_5$ also energizes the auxiliary timing network 558. Under most conditions of flash mode operation, the photosensing circuit will function as described above in response to the illumination of flashbulb 562 and to film speed (as inserted in resistor $R_3$) to cause a control covering of the aperture blade through the release of closing blade 236. Should this not be the case, auxiliary network 558 will function to deenergize coil 132 and to terminate the exposure following the select exposure interval, for instance 40 milliseconds.

Auxiliary timing network 558 includes an R-C timing-integrating arrangement including a resistor $R_8$ and a capacitor $C_4$ coupled between lines 560 and bus 498, respectively, by lines 564 and 568. At the junction between resistor $R_8$ and capacitor $C_4$, a line 570 is connected extending from line 568 to a transistor $Q_2$. Transistor $Q_2$ is shown having base, collector and emitter electrodes respectively at 572b, 572c and 572e. Base electrode 572b is coupled with line 570. Collector electrode 572c is coupled to line 564 and emitter electrode 572e is coupled with line 488 and, therefore, with the input terminal of trigger circuit 536.

With the closing of switch $S_5$, capacitor $C_4$ is charged through resistor $R_8$. The resultant voltage buildup is presented across the base-emitter junction of the transistor $Q_2$ and as it reaches a preselected triggering level, transistor $Q_2$ is forward biased to fire triggering circuit 536 from its input terminal 540. Upon receipt of the triggering signal, circuit 536 functions as earlier described to cause the release of shutter closing blade 236. A resistor $R_9$ is inserted in line 560 between its junction with line 564 and flashbulb connection 562 to function as a limiting resistor. When flash 562 is fired, the current drains occasioned through the flash circuit are limited by resistor $R_9$ to a value such that the internal impedance drop in battery 492 is not so great as to cause an inadvertent firing of trigger circuit 536.

Following the release of closing blade 236, manually actuated release button 102 is released to return to its preexposure position under the bias of springs 100 and 76. As this occurs, the common contact leaf 118 of switch $S_1$ moves from its contact with lower contact leaf 116 to reassert its contact with upper contact leaf 114. This activity would be represented in FIG. 12 as the movement of the contact member of switch $S_1$ from its orientation connecting terminals "a" and "b" to an orientation coupling terminals "a" and "c." As a result of the release of shutter opening blade 230, switch actuating assembly 280 will have caused switch $S_4$ to change from the orientation depicted in FIG. 6 to the orientation depicted in FIG. 7 wherein common contact member 336 is electrically coupled with lower leaf 340. The latter orientation is represented in FIG. 12 by a positioning of the contact member of switch $S_4$ between terminals "a" and "b." The above-described orientation of switches $S_1$ and $S_4$ following the release of shutter closing blade 236 will permit power to be supplied to battery 492 to a motor 574 coupled in line 576. Motor 574 is utilized in recocking the control mechanism as discussed later herein.

An alternate arrangement may be provided for the feedback path configuration of light sensitive circuit 450. Referring to FIG. 12a, such a configuration is portrayed. With this arrangement the feedback from photovoltaic cell 452 is provided along line 580 to a switch $S_2'$. Switch $S_2'$ selectively divides the feedback path into two parallel paths 582 and 584. The remainder of the circuit components will be recognized as unchanged over their organization as shown in FIG. 12. When the contacts of switch $S_2'$ are closed between terminals "a" and "b," the circuit performs substantially as described in connection with FIG. 12 as resistor $R_1$ is inserted exclusively within the feedback path of amplifier 454. This switch orientation corresponds to an aperture regulating mode of operation for the circuit.

When the terminals of switch $S_2'$ are closed between "a" and "c," capacitor $C_1$ is exclusively inserted into the feedback path and the circuit is operable in an exposure interval timing mode. A shunt path as shown along line 586 and including a switch $S_2''$ is required for the dual path arrangement portrayed. Switch $S_2''$ is arranged to be opened simultaneously with the opening of shutter blade 230. The changeover arm 170 as earlier described may be altered to perform the switching functions required of switches $S_2'$ and $S_2'$.

Figure 13:
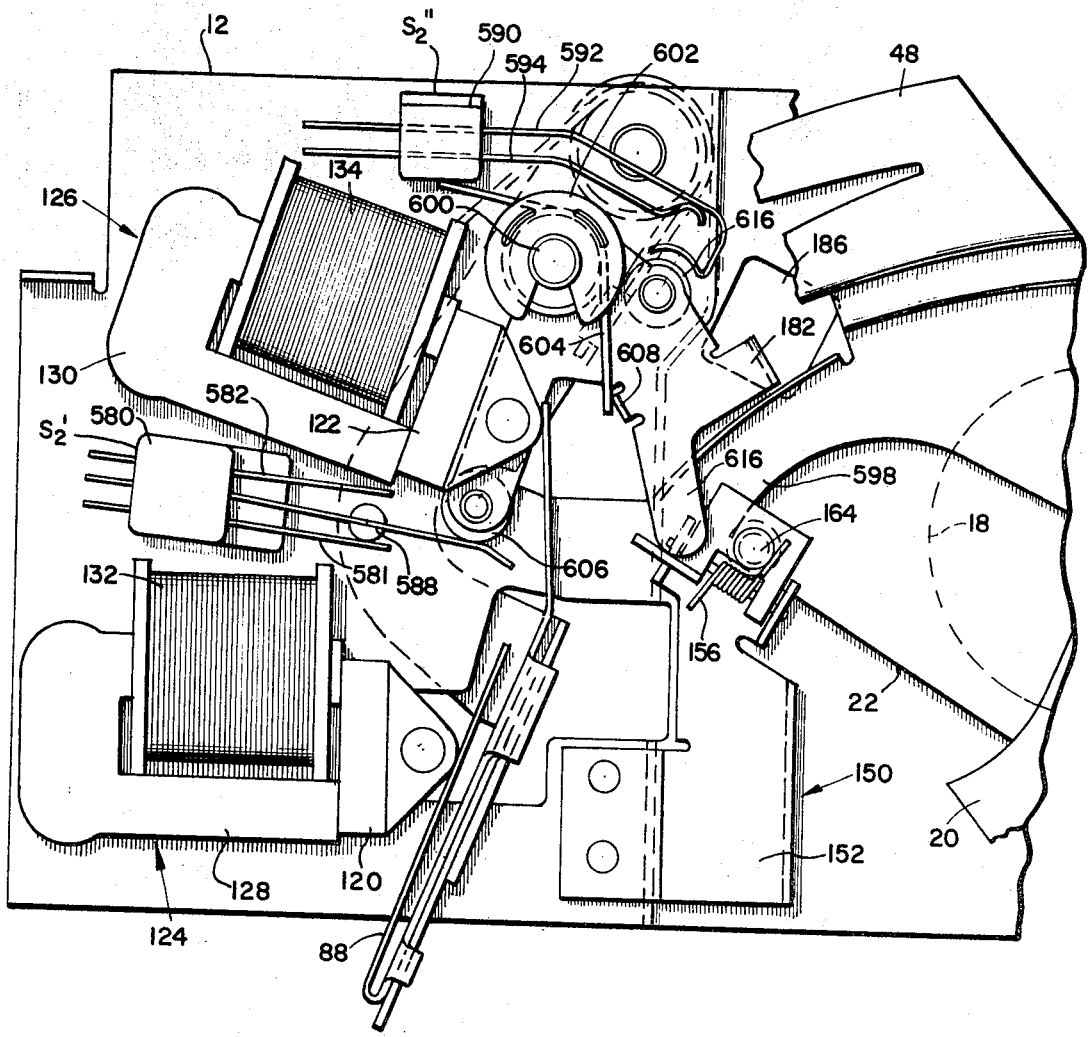
FIG. 13 is an enlarged fragmentary view of the exposure mechanism showing, however, an alternate configuration for the mode transfer actuator member of the invention.

Referring to FIG. 13, the exposure mechanism described earlier in connection with FIGS. 1, 2 and 5 is shown altered to incorporate switches $S_2'$ and $S_2''$. Switch $S_2'$ is mounted between electromagnets 124 and 126 and is formed having an electrically insulative mounting base 580 fixed to baseplate portion 12. Base 580 supports upper and lower resilient electrical contact leaves shown respectively at 582 and 584. Intermediate leaves 582 and 584 is a resilient common contact leaf 586 incorporating a cylindrical contact member 588. Common contact leaf 586 is biased to cause its contact, when released, with upper leaf 582. Switch $S_2''$ is formed having an electrical insulative mounting base 590 fixed in appropriate position upon baseplate portion 12 above electromagnet 126. Base 590 supports an upper contact leaf 592 and a lower contact leaf 594. Leaf 592 is resilient and biased for movement into contact with lower leaf 594 when released.

Switches $S_2'$ and $S_2''$ are arranged for operation in cooperation with an exposure mode transfer actuator member changeover arm depicted generally at 598.

Similar to the earlier described arm 170, changeover arm 598 mechanically associates the energized status of electromagnet 126 with the operation of brake assembly 150, switch $S_2'$, switch $S_2''$, and shutter opening blade 230. The arm is pivotally mounted upon a stud 600 depending from the baseplate 12 and is rotatably secured upon stud 600 by a retainer ring 602. One component branch 604 of the changeover arm 598 is configured and dimensioned for pivotally supporting magnetizable keeper 122 for movement into and away from an abutting position against electromagnet 126.

Branch 604 extends beyond keeper 122 to support an electrically insulative cylindrical bearing member 606 which engages common contact leaf 588 of switch $S_2'$ to hold the leaf 588 in electrical contact and engagement with lower leaf 584 when the changeover arm 598 is in its initial orientation as illustrated. A second component branch 608 of the changeover arm extends from its pivot at 600 to form a braking tip 610 which cooperates as earlier described with the brake assembly 150. As in the earlier described embodiment, arm 598 has a third component branch 612 terminating in a flanged tip portion 614 which is arranged to extend through opening 186 and selectively engage tab 260 of shutter opening blade 230. (See FIG. 6) Tip portion 614 functions in the same manner as earlier described tip portion 184 of changeover arm 170. Arm 598 is further configured having an electrically insulative cylindrical bearing member 616 arranged to abut against upper contact leaf 592 of switch $S_2''$. In the initial position of the arm shown, bearing member 616 will cause leaf 592 to be separated from leaf 594 of switch $S_2''$. Arm 598 is biased for rotation away from the initial position shown by a wire spring 618 slideably wound about stud 600 and having a fixed end abutting against a tab 620 fixed to baseplate portion 12 and a transitional end bearing against a tab 622 in the surface of arm 598.

As will be apparent from the drawings, a deenergization of electromagnet 126 in response to an output signal of the control circuitry of the system will permit the arm 598 to move under the bias of spring 618 away from electromagnetic engagement with pole member 130. As the arm rotates outwardly, brake assembly 150 is actuated to halt the movement of the aperture blades 20 and 22. Such movement also moves cylindrical bearing member 606 away from common contact leaf 588 of switch $S_2'$, thereby permitting the leaf 588 to move into contact with the upper leaf 582. The latter action will be recognized as a movement of the contact terminals of switch $S_2'$ in FIG. 12a from a position uniting contacts "a" and "b" to a position uniting contacts "a" and "c."

The pivotal movement of arm 598 will simultaneously cause bearing member 616 to urge leaf 592 of switch $S_2''$ out of electrical contact with lower leaf 594. This action will be recognized in FIG. 12a as the opening of switch $S_2''$ to permit charge buildup at capacitor $C_1$.

An exposure cycle for the instant system is completed by causing the repositioning of all exposure mechanism elements to a cocked, preexposure orientation. Referring to FIGS. 1, 2, 11 and 12, a cocking arrangement for the exposure mechanism of the invention is illustrated. The cocking assembly provides for two basic operations, namely, a movement of loading arm 70 rearwardly to an orientation permitting its relatching with release latch 92 and a repositioning of aperture blades 20 and 22 and shutter blades 230 and 236 to their preexposure orientations. Since only these two operations are required of the cocking assembly, the exposure mechanism may readily incorporate a motorized drive system.

Looking to FIGS. 1 and 2, a housing 360 for an electric drive motor is illustrated. Housing 360, incorporating the electric motor, is mounted upon baseplate portion 14. When energized, this motor causes the rotation of a spooling cam 362 rotatably mounted beneath housing 360. Rotation is imparted into the spooling cam 362 by a spooling cam driven gear 364 journaled over a cam bushing 366. Driven gear 364 is powered from a drive pinion 368 which, in turn, is operated through a reduction gear assembly 370 coupled to the electric motor. Reduction gear assembly 370 is shown only in fragmented and general fashion, its construction being conventional in the art. The opposite side of spooling cam 362 is journaled for rotation into a bracket 372 fixed to the underside of housing 360 by pan head screws as at 374.

Spooling cam 362 is grooved conventionally and is assembled in conjunction with a cam collar 376 which incorporates a cam follower 378 slideably engaged within the grooves of the spooling cam. Cam follower 378 is illustrated in FIG. 1. The cam follower includes a cylindrical stem portion 380 and is retained within the cam collar 376 by a retainer cap (not shown). This retainer cap incorporates a cylindrical stud portion 384 (FIG. 2) within which the stem portion 380 of cam follower 378 is journaled for rotative mounting. The retainer cap is mounted upon the forward face of cam collar 376 by rivets as at 386.

It will be apparent that as spooling cam 362 is rotated, cam follower 378 will cause the reciprocating translational movement of collar 376 along its lengthwise dimension. For one cocking operation this motion is used to maneuver the loading arm 70 from its release position as shown in FIG. 2 to its latched orientation shown in FIG. 1. The cam collar motion is transferred by a loading ram 390 extending across the bottom of base 10. Ram 390 is attached to the cam collar 376 by a screw 392 passing through the lower flange portion of the ram. The opposite tip of ram 390 is formed as an outwardly bent flange 394 within which is threaded an oval point setscrew 396. Ram 390 is slideably mounted upon the bottom of baseplate 10 by shoulder rivets 398 and 400 attached to the underside of the baseplate and extending, respectively, through slots 402 and 404 formed in the bottom surface of the ram. Retainer rings as at 406 and 408 hold the ram 390 in slideable relationship upon the shoulder rivets. (See FIG. 11)

Movement of cam collar 376 from one terminus of spooling cam 362 to the other will cause the setscrew 396 to engage a lower portion of loading arm 70 and urge the arm rearwardly a distance sufficient to permit the tip 96 of loading arm release latch 92 to cam over tab 98 and resume a relatching engagement therewith. As the loading arm returns to its cocked position, resilient keeper contact member 88 will reengage keeper 120 and move it into appropriate abutment with the poles of electromagnet 124. Somewhat simultaneously, keeper contact member 90 will reengage keeper 122 of changeover arm 170 and urge the keeper and its attached arm into reengagement with the electromagnet 126. A return of the changeover arm 170 to its preexposure position by loading arm 70, in turn, causes a release of brake assembly 150 from engagement with aperture blade 22. Note that braking tip 172 will move downwardly to establish contact with retracting portion 160 of the brake. Additionally, the cocking movement of the changeover arm 170 will cause the reengagement of leaves 200 and 204 of switch $S_2$ and the disengagement of leaf 200 from leaf 206. Note also at the tip portion 184 of component branch 182 of the changeover arm 170 will be moved downwardly into a relatching position with the shutter opening blade 230. As described later, a simultaneous activity of the motorized recocking system will have brought blade 230 into position to permit such relatching engagement.

It will be apparent that the similar recocking maneuvering of the changeover arm configuration 598 of FIG. 13 will provide the same functions. This latter configuration will also provide for the reengagement of the leaves 592 and 594 of switch $S_2''$ as well as the maneuvering of common contact leaf 586 of switch $S_2'$, into contact with lower leaf 584. It may be noted from the above, that the multiple function changeover arm, whether in the configuration identified at 170 or that identified at 598, provides for a recocking and resetting of all of the elements with which it is associated with relative ease and simplicity.

Contact members 88 and 90 of the loading arm 70 are configured such that a select amount of overtravel is permitted in performing the above repositioning functions. This not only allows for a reliable reengagement of the keepers or armatures with their electromagnets, but also permits a desirable amount of latitude in the design of the spooling cam drive mechanism. The extent of forward motion of the loading ram 390 is indicated in phantom at 395 in FIG. 1 of the drawings.

The movement of the loading arm 70 into its preexposure position also causes leaf 138 of switch $S_3$ to return into electrical contact with leaf 140. Note also that a mechanical advantage is gained by pushing the loading arm 70 from a position remotely displaced from its axial pivot point at 174. Spooling cam 362 is designed such that following of select number of revolutions, cam collar 376 will have moved along the length of the cam and returned once.

To return aperture blades 20 and 22 to their preexposure orientation as illustrated in FIG. 1, an aperture cocking arm 414 is rotatably mounted on extension 416 of housing 360. This rotatable mount is provided by an axle 418 journaled within extension 416 and fixed in driven relationship with cocking arm 414. Arm 414 is configured having a camming slot 420 slideable over the stem 380 of the motor driven spooling cam assembly. Arm 414 also supports a lifting stud 422 positioned thereon for selective engagement with a flange 424 formed in the edge of aperture blade 20.

Thus configured, aperture cocking arm 414 represents a variation of a bellcrank pivoted at 418 and driven from the camming relationship between stem portion 380 of the spooling cam assembly and slot 420. Energization of the motor 574 at housing 360 is provided by the closure of switch $S_1$ between terminals "a" and "c" and switch $S_4$ between terminals "a" and "b." Rotation of motor 574 will cause the stud 384 to move between the termini of spooling cam 362 which, in turn, causes lifting stud 422 to engage flange 424 of aperture blade 20 and return it to a cocked orientation. An orientation of the arm 14 as it reaches the apex of this return movement is shown in phantom in FIG. 1 at 414'. Because of the mechanical linkage of blades 20 and 22, blade 22 will be returned to its cocked orientation simultaneously with the return of blade 20. As blade 20 is returned to the aforesaid cocked position, the tip of aperture release latch 56 will cam over flange 62 along the upper edge of blade 20 until the tip of the latch reengages a slot position therein. As the stem 380 of the spooling cam arrangement returns to its initial position, both loading ram 390 and aperture cocking arm 414 will return to the orientations of FIG. 2.

Recocking movement of aperture cocking arm 414 provides for simultaneously and a corresponding movement of shutter recocking arm 322. Driving force for rotating the arm 322 is derived from the movement of axle 418 journaled within housing extension 416. Referring to FIG. 6, shutter recocking arm 322 is shown having an inwardly extending tip 326 configured and arranged to contact and cam against the flange 248 of opening blade 230 upon rotation of the arm. As the arm 322 rotates to the phantom position 322', opening blade 230 is pivoted against the bias of spring 240 into relatching engagement with flange 184 of changeover arm 170. As blade 230 pivots towards reengagement with flange 184, its outwardly bent flange portion 262 will have reengaged notch 264 inclosing blade 236 so as to cause the simultaneous repositioning of both the opening and closing blades. As shutter cocking arm 322 rotates to the position shown in phantom at 322', tip 336 having moved to its position at 326', flange 362 will have reengaged notch 264 and the changeover arm 170 will have been rotated by loading arm 70 to cause the gradual repositioning of flange tip portion 184 in position holding opening blade 230 in a preexposure orientation. Similarly, closing blade latch 258 will cam against the outer edge of closing blade 236 to reassert its latching engagement with flange 270. Latch 258 is held in its final position by virtue of the engagement of its keeper 120 with contact member 88 of loading arm 70. It will be apparent that the flange tip portion 614 of the changeover arm embodiment of FIG. 13 will perform the equivalent function of tip portion 184 of the embodiment identified at 170.

At the commencement of a recocking maneuver, switch actuating assembly 280 will have the orientation illustrated in FIG. 7, the contact leaves 336 and 334 of switch $S_4$ being held in a closed position. During a cocking maneuver, arm 322 will rotate to a position where its notch 324 will have moved out of engagement with bus stud 310. As arm 322 is rotated in a return motion, the inwardly facing upper edge 320 of the arm will reengage push stud 310 and move switch actuating lever 382 into the orientation shown in FIG. 6. As arm 322 reaches the terminal position illustrated in that figure, contact leaves 334 and 336 of switch $S_4$ are separated while contact leaves 336 and 332 are joined. This activity in conjunction with the operation of switch $S_1$ provides for the proper energization of the motor 574 at housing 360.

Looking in particular to this operation, following the release of shutter closing blade 236, manually actuated release button 102 is released to return to its preexposure position under the bias of springs 100 and 76. As this occurs, the common contact leaf 118 of switch $S_1$ moves from its contact with lower contact leaf 116 to reassert its contact with upper contact leaf 114. This activity would be represented in FIG. 12 as the movement of the contact member of switch $S_1$ from its orientation connecting terminals "a" and "b" to an orientation coupling terminals "a" and "c." As a result of the release of shutter opening blade 230, switch actuating assembly 280 will have caused switch $S_4$ to change from the orientation depicted in FIG. 6 to the orientation depicted in FIG. 7 wherein common contact member 336 is electrically coupled with lower leaf 340. The latter orientation is represented in FIG. 12 by a positioning of the contact member of switch $S_4$ between terminals "a" and "b." Thusly oriented, switches $S_1$ and $S_4$ permit power to be supplied from battery 492 to motor 574 coupled in line 576. Mounted within housing 360, motor 574 drives the spooling cam 362 through one complete cocking cycle and, in performing this function, remains energized until actuating assembly 280 returns to a preexposure position. The latter return, in turn, causes switch $S_4$ to resume the orientation shown in FIG. 6. This orientation is depicted in FIG. 12 as a closing of the contact member of switch $S_4$ against terminals "a" and "c." Note that this switching action inserts line 578 into the energizing circuit of motor 574 to provide a dynamic braking action. Such dynamic braking provides for the proper repositioning of spooling cam collar 376 at the end of a cocking cycle.

Since certain changes may be made in the above exposure control mechanism without departing from the scope of the invention herein involved, it is intended that matter contained in the above description or shown in the accompanying drawings shall be interpreted as illustrative and not in a limiting sense.

I claim:

1. An exposure control system for photographic apparatus comprising:

aperture defining means having at least one element movable between terminal positions defining minimum and maximum exposure aperture areas over an optical path of said apparatus;

spring means for urging said element from one terminal position toward the other terminal position;

an aperture brake assembly including a braking component selectively movable into braking engagement with a surface of said element and biasing means for urging said braking component from a retracted position into said braking engagement;

a shutter assembly having at least one element mechanically releasable from a first position to cause the commencement of an exposure;

exposure mode transfer actuator means having an abutting portion contactable with a portion of said braking component for selectively retaining said component in said retracted position and movable from an initial position codirectionally with said portion of said braking component for permitting said braking component to move into contact with said surface to halt the movement thereof at a select exposure aperture by a wedging restraint and, simultaneously, for initiating the said release of said shutter assembly element; and photoresponsive control means for selectively retaining said exposure mode transfer actuator means in said initial position and for selectively causing said actuator means to move from said initial position.

2. The exposure control mechanism of claim 1 including biasing means for urging said exposure mode transfer actuator means away from said initial position.

3. The exposure control mechanism of claim 1 in which said braking component is mounted for pivotal contact with said aperture defining means and said pivotal mount is spaced a select distance from the said surface of said element.

4. The exposure control system of claim 1 in which said photoresponsive control means comprises:
control circuit means for providing an output signal responsive to the light levels of a scene; and
at least one electromagnet selectively energizable at different levels in response to said output signal for providing said selective retention of said exposure mode transfer means in said initial position.

5. The exposure control mechanism of claim 4 wherein said exposure mode transfer actuator means is formed incorporating armature means mounted upon and movable with said actuator means for providing abutting engagement with said electromagnet when said actuator means is in said initial position.

6. The exposure control mechanism of claim 5 wherein said exposure mode transfer actuator means is configured and arranged to provide abutting engagement with said shutter assembly element for selectively preventing the movement thereof when said actuator means is oriented in said initial position and for initiating the movement of said shutter assembly element from said first position when said armature means is released from said engagement with said electromagnet.

7. The exposure control mechanism of claim 5 in which said exposure mode transfer actuator means is configured and mounted for pivotal movement into and away from said initial position.

8. The exposure control mechanism of claim 5 in which said exposure mode transfer actuator means is configured and arranged to retain said braking component in said retracted position when said armature means is in said abutting engagement and to initiate release of said braking component for movement into said braking engagement simultaneously with the release of said armature means from said engagement.

9. The exposure control mechanism of claim 8 wherein said exposure mode transfer actuator means is configured and arranged to provide abutting engagement with said shutter assembly element for preventing the movement thereof when said actuator means is oriented in said initial position and for initiating said movement from said first position simultaneously with the release of said armature means from engagement with said electromagnet.

10. The exposure control mechanism of claim 9 including biasing means for urging said exposure mode transfer actuator means away from said initial position.

11. An exposure control system for controllably varying both the effective area of an exposure aperture and, in sequence, the exposure interval during which light passes through said aperture comprising:
aperture determining means having at least one element movable between terminal positions defining minimum and maximum exposure aperture areas;
spring means for urging said element from one said terminal position toward the other said terminal position;
an aperture brake assembly including a braking component selectively movable into braking engagement with a surface of said aperture defining means element and biasing means for urging said braking component from a retracted position into said braking engagement;
a shutter assembly having at least one spring loaded element releasable from a first position to cause the commencement of an exposure interval;
an exposure mode transfer actuator having an abutting portion contactable with a portion of said braking component for selectively retaining said component in said retracted position, said abutting portion being movable from an initial position codirectionally with said portion of said braking component for releasing said braking component from said retracted position, said actuator being configured and arranged to initiate the said release of said shutter assembly element simultaneously with said movement;
light sensitive control circuit means for developing an aperture regulating output signal when operating in a first exposure mode, and for developing an exposure interval regulating output signal when operating in a second exposure mode; and
electromagnetic means selectively energizable at different levels in response to said output signals for causing said exposure mode transfer actuator to move from said initial position in response to said aperture regulating output signal and for regulating the interval of an exposure defined by said shutter assembly in response to said exposure interval regulating output signal.

12. The exposure control system of claim 11 including switch means actuable in response to the movement of said exposure mode transfer actuator for causing said control circuit means to operate in said first exposure mode when said exposure mode transfer actuator is in said initial position and for causing said control circuit means to convert to said second exposure mode when said exposure mode transfer actuator is moved from said initial position.

13. The exposure control system of claim 12 in which:
said control circuit means includes a light sensitive network having a first control path for causing said circuit means to derive said aperture regulating output signal and a second discrete path for causing said circuit means to derive said exposure interval regulating output signal; and
said switch means is configured and arranged to selectively insert said first path within said network when said transfer actuator is in said initial position and to insert said second path within the network in response to the said movement of said transfer actuator from said initial position.

14. The exposure control system of claim 12 in which said electromagnet means includes an electromagnet selectively deenergizable in response to said aperture regulating output signal; and
said exposure mode transfer actuator is formed incorporating armature means mounted upon and movable with said actuator into abutting engagement for magnetic attachment with said electromagnet when said actuator is in said initial position.

15. The exposure control system of claim 14 including means for biasing said exposure mode transfer actuator away from said initial position.

16. The exposure control system of claim 14 wherein said exposure mode transfer actuator is configured and arranged to provide abutting engagement with said shutter assembly element and is operative to selectively prevent the movement thereof when said actuator is oriented in said initial position, said actuator initiating the said movement of said element from said first position simultaneously with the release of said armature means from engagement with said electromagnet.

17. The exposure control system of claim 14 in which said exposure mode transfer actuator is configured and mounted for pivotal movement into and away from said initial position.

18. The exposure control system of claim 17 in which said exposure mode transfer actuator is configured and arranged to retain said braking component in said retracted position when said armature means is in said abutting engagement and to initiate release of said braking component into said engagement simultaneously with the release of said armature means from said magnetic engagement.

19. An exposure control mechanism for photographic apparatus comprising:
aperture defining means having at least one element movable between terminal positions defining minimum and maximum exposure aperture areas;
spring means for urging said element from one said terminal position towards the other terminal position;

a braking assembly having a braking component pivotally releasable from a retracted position for movement into engagement with said aperture defining means for halting the movement of said element at a position determining a select aperture;

a shutter assembly including first and second blades movable between blocking terminal positions and unblocking terminal positions relative to said selected aperture;

bias means associated with each of said blades for urging the first blade towards its unblocking terminal position and the second blade towards its blocking terminal position;

an exposure mode transfer actuator configured and arranged having an initial position causing the retention of said first blade in said unblocking position and providing abutting contact with a portion of said braking component causing said component to assume said retracted position, said transfer actuator being movable from said initial position codirectionally with said portion to cause the release of said braking component from said free position and the release of said first blade from said blocking position;

armature means mounted upon said exposure mode transfer actuator; and an electromagnet selectively energizable at different levels from a control circuit and so configured and arranged that said armature means is engageable for magnetic coupling therewith to selectively retain said exposure mode transfer actuator in said initial position.

20. The exposure control mechanism of claim 19 including means for biasing said exposure mode transfer actuator away from said initial position.

21. The exposure control mechanism of claim 20 in which said exposure mode transfer actuator is configured and mounted for pivotal movement into and away from said initial position.

22. The exposure control mechanism of claim 21 wherein said exposure mode transfer actuator includes:

a first component branch formed integrally therewith and configured to define a flange portion for selectively retaining said first shutter blade in unblocking position; and a second component branch formed integrally therewith and having a tip portion configured and arranged to retain said braking component in said retracted position when said transfer actuator is in said initial position.

23. The exposure control mechanism of claim 22 including a second electromagnet selectively energizable at different levels from said control circuit and operatively associated with said second shutter blade to retain said blade in an unblocking position for a select interval of time following the said movement of said exposure mode transfer actuator.

24. The exposure control mechanism of claim 22 including switch actuator means mounted upon said exposure mode transfer actuator and movable therewith for causing the alteration of said control circuit from operation in an aperture regulating mode to operation in an exposure timing mode in coincidence with the movement of said transfer actuator from said initial position.

25. The exposure control mechanism of claim 24 including means for biasing said braking component from said retracted position towards said contact with said aperture defining means.